United States Patent
Chen et al.

(10) Patent No.: US 7,292,863 B2
(45) Date of Patent: Nov. 6, 2007

(54) ADMISSION CONTROL METHOD AND DEVICE IN MOBILE COMMUNICATION SYSTEM

(75) Inventors: Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 245 days.

(21) Appl. No.: 10/714,662

(22) Filed: Nov. 18, 2003

(65) Prior Publication Data
US 2004/0097240 A1 May 20, 2004

(30) Foreign Application Priority Data
Nov. 19, 2002 (JP) ............................. 2002-335719

(51) Int. Cl.
*H04Q 7/20* (2006.01)
(52) U.S. Cl. ............... 455/452.2; 455/450; 455/435.2; 455/67.11
(58) Field of Classification Search ............. 455/422.1, 455/67.11, 464, 436, 445, 442, 440, 423, 455/452.2, 450, 435.2; 370/335, 468, 236, 370/237, 230, 401, 395.43, 395.21
See application file for complete search history.

(56) References Cited
U.S. PATENT DOCUMENTS
6,072,787 A  6/2000 Hamalainen et al.
6,216,006 B1  4/2001 Scholefield et al.
6,683,853 B1 * 1/2004 Kannas et al. ............... 370/237

FOREIGN PATENT DOCUMENTS
| JP | 10-108260 | 4/1998 |
| JP | 11-69431 | 3/1999 |
| JP | 2002-76985 | 3/2002 |
| JP | 2002-204481 | 7/2002 |
| WO | WO 01/41376 | 6/2001 |

OTHER PUBLICATIONS
S. Sasaoka, pp. 138-147, "Mobile Communication", May 25, 1998.
D. E. McDysan, et al., "ATM Network", translated by M. Muraoka, Section 13.6, pp. 406-407, "Connection Admission Control", Sep. 10, 1997.

* cited by examiner

*Primary Examiner*—Temica Beamer
(74) *Attorney, Agent, or Firm*—Oblon, Spivak, McClelland, Maier & Neustadt, P.C.

(57) ABSTRACT

A method is disclosed that is capable of appropriately assigning radio resource even when a propagation quality changes. After receiving the required communication rate from the mobile station, the base station measures the maximum used radio resource, and multiplies the maximum used radio resource by a factor $\alpha$. Next, the base station subtracts the above result from the total radio resource and obtains the maximum assignable radio resource. Then, the base station calculates an admissible communication rate based on the maximum assignable radio resources. Then, if the required communication rate is less than or equal to the admissible communication rate, the base station admits the request.

18 Claims, 22 Drawing Sheets

FIG.2

| FLOW LABEL (20bits) | QoS_rq (5bits) |
|---|---|

FIG.3

| QoS_REQUEST-BIT | QoS_rqmax | QoS_rqmin |
|---|---|---|
| 00001 | 32kbps | 32kbps |
| 00010 | 64kbps | 32kbps |
| 00011 | 128kbps | 32kbps |
| 00100 | 384kbps | 32kbps |
| 00101 | 1Mbps | 32kbps |
| 00110 | 2Mbps | 32kbps |
| 00111 | 5Mbps | 32kbps |
| 01000 | 10Mbps | 1Mbps |
| 01001 | 15Mbps | 1Mbps |
| 01010 | 20Mbps | 1Mbps |
| 11111 | SERVICE CANCEL | |

FIG.4

| CQI | SINR (dB) | MCS | TOTAL TRANSMISSION RATE (Mbps) | RATE PER SLOT (Mbps) | TBS/slot (kbit) |
|---|---|---|---|---|---|
| 1 | 3.8 | QPSK1/2 | 22 | 2.2 | 1.1 |
| 2 | 5 | QPSK3/4 | 34 | 3.4 | 1.7 |
| 3 | 6.5 | 16QAM1/2 | 45 | 4.5 | 2.25 |
| 4 | 10.5 | 16QAM3/4 | 68 | 6.8 | 3.4 |
| 5 | 13 | 64QAM3/4 | 102 | 10.2 | 5.1 |

ADMISSION CONTROL METHOD AND DEVICE IN MOBILE COMMUNICATION SYSTEM

BACKGROUND OF THE INVENTION

1. Field of the Invention

The present invention relates to a method of admitting a service request from a mobile station to an admission control device in a mobile communication system that is capable of providing a quality-guaranteed service and a quality-not-guaranteed service at the mobile station, and the admission control device.

2. Description of the Related Art

In the conventional circuit switching service, when a base station receives a request for a service from a mobile station, the base station, acting as an admission control device, determines whether the request can be admitted based on the radio resources, specifically, the number of available channels, such as the number of carriers, time slots, codes, etc., assigned to the cell formed by the base station itself, and if the number of the assigned channels is greater than a predetermined value, the base station admits the request.

In a conventional ATM (Asynchronous Transfer Mode) service, when an admission control device, such as an ATM switching system, receives a request for a service from a communication apparatus, the ATM switching system determines whether the request can be admitted based on available capacity of the path, that is, the ATM transmission channel, and on the available buffer for storing ATM cells. If the available capacity of the path and the available buffer are greater than a predetermined value, the base station admits the request.

When packet communications are performed for providing a conventional circuit switching service, because of the quality required by voice and data that share the channel, and because there are a large variety of packets, the communication quality changes after the service request is admitted.

However, as mentioned above, in the conventional circuit switching service, because admission of the request is determined based only on the assigned channels, change of the propagation quality is not considered. This conventional method is not sufficient for a mobile communication system in which the propagation quality changes frequently. In addition, in the conventional ATM service, the capacity of the path and the buffer occupied by the communications are constant after the service request is admitted. Therefore, the method used in the conventional ATM service is not suitable for a mobile communication system in which the communication rate in the cell formed by the base station changes greatly because of variation of interference and movement of the mobile stations.

SUMMARY OF THE INVENTION

Accordingly, it is a general object of the present invention to solve one or more problems of the related art.

A more specific object of the present invention is to provide an admission control method in a mobile communication system capable of appropriately assigning radio resources even when a propagation quality changes, an admission control device, a mobile station, and a mobile communication system.

According to a first aspect of the present invention, there is provided a method of an admission control device in a mobile communication system capable of providing a first communication that guarantees a predetermined quality and a second communication that does not guarantee the predetermined quality at a mobile station. The method comprises a step of sending a notification of the predetermined quality to the admission control device by the mobile station when a request for the first communication is made, and a step of calculating, by the admission control device, a reference quality admissible when a propagation quality is lowest at the mobile station, a step of determining, by the admission control device, whether to admit the request of the mobile station based on the reference quality.

As an embodiment, the admission control device may admit the request of the mobile station when the predetermined quality is less than or equal to the reference quality. If the predetermined quality is distributed in a range, the admission control device may admit the request of the mobile station when the reference quality is in the range of the predetermined quality.

According to the present invention, the reference quality is calculated by assuming a situation in which the propagation quality at the mobile station corresponds to the lowest level obtainable at the mobile station, for example, in the case in which the mobile station is at the edge of a cell formed by a base station acting as the admission control device. In addition, the base station compares the predetermined quality and the reference quality to determine whether the request from the mobile station can be admitted. For example, the admission control device may admit the request if the predetermined quality is less than or equal to the reference quality. Due to this, even at places where the propagation quality is low, the mobile station is able to maintain communications. In other words, regardless of changes of the propagation quality, radio resources can be appropriately assigned.

Preferably, the admission control device may calculate the reference quality from an assignable radio resource. The assignable radio resource may be calculated by subtracting the radio resource being used by communications different from the first communication from a total available radio resource. Alternatively, the assignable radio resource may be calculated by subtracting a radio resource assigned to the other communications having the lowest propagation quality from the total available radio resource.

According to the present invention, when a part of the assigned radio resource is not used, for example, if the amount of transmission data is less than expected, the admission control device may calculate the assignable radio resource by subtracting the radio resource actually used by other communications rather than the request communication from a total available radio resource, and the assignable radio resource is the maximum radio resource assignable to the requested communication. Due to this, it is possible to use the radio resources effectively. At least, the difference between the total available radio resource and the radio resource assigned to the other communications having the lowest propagation quality may be used as the assignable radio resource. Since the assignable radio resource obtained in this way does not include radio resources used by the other communications, it can be surely assigned to the requested communication.

More preferably, if the predetermined quality is greater than the reference quality, the admission control device transmits the reference quality to the mobile station. Receiving this information from the admission control device, and if the predetermined quality is in a range from a lower limit to an upper limit, the mobile station may change the predetermined quality to the reference quality if the lower limit is less than or equal to the reference quality, and may change the first communication to the second communication if the lower limit is higher than the reference quality.

According to the present invention, if the predetermined quality is greater than the reference quality and the admission control device rejects the request, the mobile station is notified of this decision together with the reference quality. Upon that, the mobile station may take necessary steps in response, for example, the mobile station may change the value of the predetermined quality, or change the requested communication to a communication that does not require a constant quality.

More preferably, the admission control device preferentially assigns a radio resource to the first-communication rather than to the second communication.

Due to this, a larger number of the first communications may be provided.

According to a second aspect of the present invention, there is provided a mobile communication system including a mobile station and an admission control device for controlling admission of a request from the mobile station, capable of providing a first communication that guarantees a predetermined quality and a second communication that does not guarantees the predetermined quality. The mobile station includes a transmission unit configured to send a notification of the predetermined quality to the admission control device when the mobile station requests the first communication, and the admission control device includes a calculation unit configured to calculate a reference quality admissible when a propagation quality is lowest at the mobile station, and a determination unit configured to determine whether to admit the request of the mobile station based on the reference quality.

According to a third aspect of the present invention, there is provided a mobile station capable of requesting from an admission control device for a first communication that guarantees a predetermined quality and a second communication that does not guarantee the predetermined quality at the mobile station. The mobile station comprises a transmission unit configured to send a notification of the predetermined quality to the admission control device when a request for the first communication is made, and a modification unit configured to change the predetermined quality to a reference quality admissible when a propagation quality is lowest at the mobile station if the predetermined quality is less than or equal to the reference quality, and to change the first communication to the second communication if the predetermined quality is higher than the reference quality.

According to a fourth aspect of the present invention, there is provided an admission control device for controlling admission of a request from a mobile station for a first communication that guarantees a predetermined quality and a second communication that does not guarantee the predetermined quality. The admission control device comprises a calculation unit configured to calculate a reference quality admissible when a propagation quality is lowest at the mobile station, and a determination unit configured to determine whether to admit the request of the mobile station based on the reference-quality.

According to a fifth aspect of the present invention, there is provided a program for admission control of a request from a mobile station for a first communication that guarantees a predetermined quality and a second communication that does not guarantee the predetermined quality at a mobile station, comprising the steps of sending a notification of the predetermined quality to an admission control device when the first communication is requested, and changing the predetermined quality to a reference quality admissible when a propagation quality is lowest at the mobile station if the predetermined quality is less than or equal to the reference quality, and changing the first communication to the second communication if the predetermined quality is higher than the reference quality.

According to a sixth aspect of the present invention, there is provided a program for operating an admission control device that controls admission of a request from a mobile station for a first communication guaranteeing a predetermined quality and a second communication not guaranteeing the predetermined quality, comprising the steps of calculating a reference quality admissible when a propagation quality is lowest at the mobile station, and determining whether to admit the request of the mobile station based on the reference quality.

These and other objects, features, and advantages of the present invention will become more apparent from the following detailed description of the preferred embodiments given with reference to the accompanying drawings.

BRIEF DESCRIPTION OF THE DRAWINGS

FIG. 2 is a table showing a format of the admission request message;

FIG. 3 is a table showing an example of a corresponding relation between the QoS-request-bit and the combination of the upper limit and the low limit of the required communication rate;

FIG. 4 is a table showing a corresponding relation between CQI, a modulation scheme, and the communication rate;

DESCRIPTION OF THE PREFERRED EMBODIMENTS

Below, a general description and specific descriptions of preferred-embodiments of the present invention are presented with reference to the accompanying drawings.

General Description

Figure 1:
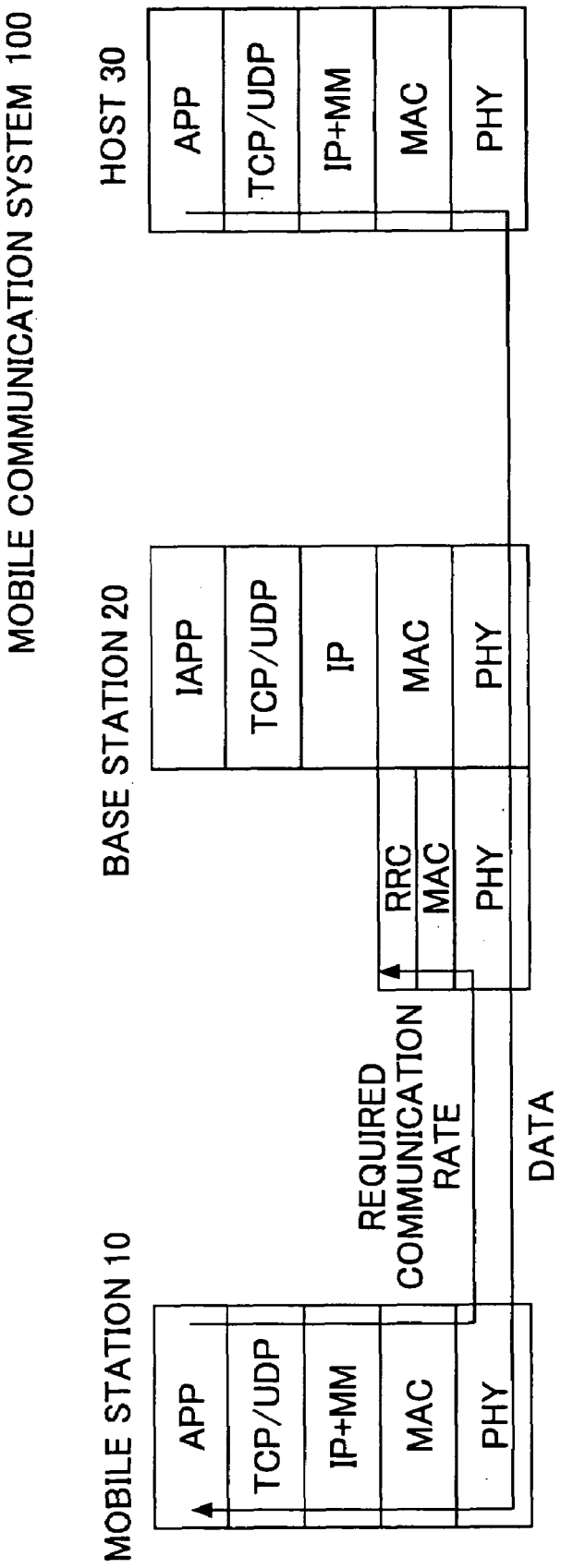
FIG. 1 is a schematic view of an example of a configuration of a mobile communication system according to an embodiment of the present invention from the viewpoint of communication protocols.

FIG. 1 is a schematic view of an example of a configuration of a mobile communication system according to an embodiment of the present invention from the viewpoint of communication protocols.

The mobile communication system 100 shown in FIG. 1 includes a mobile station 10, a base station 20 that functions as an admission control device and provides a service having a desired quality and a service having an arbitrary quality for the mobile station 10, and a host 30 acting as a communication party of the mobile station 10. The configuration in FIG. 1 is for downlink data transmission, that is, data transmission from the host 30 to the mobile station 10.

The communication protocol in the mobile station 10 includes, from bottom to top, a physical layer (PHY layer), a media access control layer (MAC layer), an IP+MM layer, a TCP/UDP layer, and an application layer (APP). The communication protocol in the base station 20 at the side of the mobile station 10 includes, also from bottom to top, a PHY layer, a MAC layer, and a radio resource control layer (RRC). The communication protocol in the base station 20 at the side of the host 30 includes, from bottom to top, a PHY layer, a MAC layer, an IP layer, a TCP/UDP layer, and an application layer (IAPP). The communication protocol in the host 30 includes, also from bottom to top, a PHY layer, a MAC layer, an IP layer, a TCP/UDP layer, and an application layer (APP).

When sending data in the downlink direction, the APP layer of the host 30 sends a request for connecting to the APP layer of the mobile station 10. After receiving the request, in the mobile station 10, an application is newly invoked (or called) for realizing the requested service. Based on the type of the newly called application, the APP layer of the mobile station 10 selects either a service that guarantees the desired quality of service (QoS) (for example, a communication rate) or a service that may have an arbitrary quality of service (QoS), in other words, a service that does not guarantee the quality of service (QoS). This selected service is that to be requested from the base station 20. The newly called application is referred to as "new application" below. In the following description, the service that guarantees the desired quality of service is referred to as "quantitatively-guaranteed service", and the service that may have any quality of service is referred to as "relatively-guaranteed service".

When the APP layer of the mobile station 10 requests a quantitatively-guaranteed service, the APP layer, using a control channel, sends an admission request message including the communication rate required by the new application called in the quantitatively-guaranteed service. Below, this communication rate is referred to as "required communication rate", and is represented by QoS_rq where necessary.

FIG. 2 is a table showing a format of the admission request message. As shown in FIG. 2, the admission request message includes a twenty-bit flow label and five bits of data indicating the required communication rate in the quantitatively-guaranteed service. When requesting a relatively-guaranteed service, the APP layer of the mobile station 10 does not send the admission request message.

The APP layer of the mobile station 10 may include only one required communication rate in the admission request message, or an upper limit and a low limit of the required communication rate in the admission request message; alternatively, the APP layer of the mobile station 10 may include identifiers that identify the combination of the upper limit and the low limit of the required communication rate in the admission request message. This identifier is referred to as "QoS-request-bit". FIG. 3 is a table showing an example of a corresponding relation between the QoS-request-bit and the combination of the upper limit and the low limit of the required communication rate (represented by QoS_rqmax and QoS_rqmin, respectively, where necessary). As shown in FIG. 3, when the highest required communication rate is 128 kbps, and the lowest required communication rate is 32 kbps, the QoS-request-bit is "00011". As shown in FIG. 3, the QoS-request-bit "11111" is used for making a request to the base station for canceling the quantitatively-guaranteed service.

When the quantitatively-guaranteed service is requested, it is required that the service must be provided at the communication rate required by the mobile station 10, no matter where the mobile station 10 is in the cell formed by the base station 20. For this purpose, the base station 20 needs to perform service request admission control while taking into consideration the variation of interferences and movement of the mobile station 10. In detail, the base station 20 performs service admission control in the following way.

Among the total radio resources available for data transmission in the downlink direction, a part of them has been assigned to applications that have been called previously by other quantitatively-guaranteed services. The other applications include applications previously called in the mobile station 10 and applications previously called in other mobile stations for other quantitatively-guaranteed services. These applications that have been called previously as a whole are referred to "other applications". Among the radio resources assigned to the other applications, only a part of them is used. The RRC layer of the base station 20 measures the amount of the radio resources actually used by the other applications (referred to as "used radio resources" below).

The used radio resources change with the propagation quality between the mobile stations related to the other applications and the base station 20. The RRC layer of the base station 20 determines the used radio resources following the procedure below.

When transmitting data in the downlink direction, the APP layers of the mobile station 10 and other mobile stations send data to the RRC layer of the base station 20 indicating the propagation quality between them and the base station 10. If the mobile communication system uses the HSDPA (High Speed Downlink Packet Access), the so-called 3.5th generation mobile communication scheme, data indicating the propagation quality is CQI. Here, it is assumed that CQI is larger when the propagation quality is better. Of course, it may be defined in other ways, for example, CQI becomes smaller when the propagation quality becomes better.

Based on CQI, the RRC layer of the base station 20 determines the radio resources actually used by the other applications.

FIG. 4 is a table showing a corresponding relation between CQI, a modulation scheme, and the communication rate. The table in FIG. 4 shows the relation between a given CQI, the propagation quality corresponding to the given CQI, the modulation coding scheme (MCS) to be adopted in response to the CQI, the total transmission rate corresponding to the modulation coding scheme, the transmission rate in one slot in each frame, and the amount of data transmittable in one slot (TBS/slot). Here, SINR (Signal to Noise Ratio) is used as the propagation quality, but other quantities, such as BER (bit error rate), and FER (Frame Error Rate) may also be used. Further, in FIG. 4, it is assumed that the radio resources are managed in terms of frames, one frame consists of ten slots, and one slot occupies 0.5 ms.

For example, considering the case in which the mobile station 10 and other mobile stations, where the other applications have been called and which are communicating at a rate of 4 Mbps, send a CQI of 2 to the base station 20. In this case, based on the mapping table in FIG. 4, the RRC layer of the base station 20 identifies that the modulation and coding scheme (MCS) is QPSK3/4 in the communications with the other applications when CQI is 2. The RRC layer of the base station 20 identifies that the total transmission rate is 34 Mbps per frame of the radio resources when QPSK3/4 is used, and the transmission rate for one slot in one frame is 3.4 Mbps. Further, based on the identified results, the RRC layer of the base station 20 identifies that the other applications are using two such slots in order to satisfy the required communication rate of 4 Mbps for the other applications.

The RRC layer of the base station 20 measures the used radio resources in the above way for a predetermined period, and determines the maximum of the used radio resources in the same period.

Next, the RRC layer of the base station 20 calculates the radio resources assignable to the new application (referred to as "assignable radio resources" below) by subtracting the maximum of the used radio resources from the total radio resources. For example, one frame, which corresponds to the total radio resources, consists of ten slots, and the maximum of the used radio resources corresponds to four slots; the RRC layer of the base station 20 subtracts four slots from the total ten slots, and the obtained result (six slots) is the maximum assignable radio resources for the new application.

From the definitions of the quantities used in the above calculations, it is clear that the obtained maximum assignable radio resources for the new application also include the resources actually used by applications called by the relatively-guaranteed service. Therefore, the RRC layer of the base station 20 may multiplies the maximum of the used radio resources by a factor $\alpha(0<\alpha\leq 1)$ to obtain more accurate assignable radio resources for the new application.

Instead of determining the maximum of the radio resources actually used by the other applications, the RRC layer of the base station 20 may determine the radio resources assigned to the other applications when the propagation quality is the lowest between the base station 20 and the mobile stations where the other applications are called. For example, assume the mobile stations are at the edge of the cell formed by the base station 20. The determined radio resources assigned to the other applications are the maximum radio resources that may be used in communications of the other applications.

Then, the RRC layer of the base station 20 subtracts the determined radio resources assigned to the other applications from the total radio resources, and uses the result as the assignable radio resources for the new application.

From the definitions of the above quantities, it is clear that the obtained assignable radio resources also include the resources used by applications corresponding to the relatively-guaranteed service, therefore, in the above calculation, the RRC layer of the base station 20 may multiply the resultant assignable radio resources by a factor $\beta(0<\beta\leq 1)$ as the true assignable radio resources.

After calculation of the assignable radio resources to the mobile station 10, the RRC layer of the base station 20 calculates the communication rate when the propagation quality is the lowest between the mobile station 10 and the base station 20, and uses this communication rate as a reference in admission control. Below, this communication rate is referred to as "admissible communication rate", and represented by "AC_avail" where necessary.

In detail, the RRC layer of the base station 20 determines the communication rate for each set of radio resources when the propagation quality is the lowest between the mobile station 10 and the base station 20, and multiplies by the total number of the assignable radio resources for the mobile station 10 at the determined communication rate.

For example, according to the mapping table in FIG. 4, the RRC layer of the base station 20 determines that when the propagation quality is the lowest between the mobile station 10 and the base station 20, the modulation and coding scheme used in communications in the mobile station 10 is QPSK1/2, and the transmission rate in QPSK1/2 for one slot is 2.2 Mbps. Further, if the assignable radio resources for the mobile station 10 are six slots, the RRC layer of the base station 20 calculates 6×2.2 Mbps=13.2 Mbps, and this is the admissible communication rate.

Next, the RRC layer of the base station 20 compares the admissible communication rate with the required communication rate. If the admission request message includes only one required communication rate, and if the required communication rate is lower than the admissible communication rate, the RRC layer of the base station 20 admits the request for the service by executing the new application, and sends an admission control result to the APP layer of the mobile station 10. Further, the base station 20 assigns a certain amount of radio resources that enables communications at the required communication rate even when the propagation quality is the lowest between the mobile station 10 and the base station 20.

For example, according to the mapping table in FIG. 4, the RRC layer of the base station 20 determines that the transmission rate per slot is 2.2 Mbps when the propagation quality is the lowest between the mobile station 10 and the base station 20 (that is, CQI=1). Assume that only one required communication rate is included in the admission request message, and the required communication rate is 4 Mbps. Because the required communication rate is less than the admissible communication rate (2.2 Mbps×6=13.2 Mbps), the RRC layer of the base station 20 admits the request for the service by the new application. Then the base station 20 assigns two slots to the new application in order to enable communications at 4 Mbps in the mobile station 10.

If the admission request message includes the upper limit and the lower limit of the required communication rate, and if the upper limit of the required communication rate is lower than the admissible communication rate, the RRC layer of the base station 20 admits the request for the service by the new application, and sends an admission control result to the APP layer of the mobile station 10. At the same time, the base station 20 assigns a certain amount of radio resources enabling communications at the highest required communication rate even when the propagation quality is the lowest between the mobile station 10 and the base station 20.

If the admissible communication rate is between the upper limit and the lower limit of the required communication rate, the RRC layer of the base station 20 admits the request for the service by the new application, and sends an admission control result to the APP layer of the mobile station 10. At the same time, the base station 20 assigns radio resources enabling communications at the highest required communication rate, even when the propagation quality is the lowest between the mobile station 10 and the base station 20.

For example, when the propagation-quality is the lowest between the mobile station 10 and the base station 20, that is, CQI=1 in FIG. 4, the transmission rate for one slot is 2.2 Mbps. Assume that the admissible communication rate is between the highest and lowest required communication rates, and its value is 4 Mbps, the base station 20 assigns two slots to the new application in order to enable communications at 4 Mbps in the mobile station 10.

If the admission request message includes only one required communication rate, and if the required communication rate is higher than the admissible communication rate, the RRC layer of the base station 20 does not admit the request for the service by the new application, and sends a request rejection message and the admissible communication rate to the APP layer of the mobile station 10.

If the admission request message includes the upper limit and the lower limit of the required communication rate, and if the lower limit of the required communication rate is higher than the admissible communication rate, the RRC layer of the base station 20 does not admit the request for the service by the new application, and sends a request rejection message to the APP layer of the mobile station 10. Even after rejecting the request, the RRC layer of the base station 20 continues calculating the admissible communication rate periodically, comparing the admissible communication rate and the required communication rate, and when the upper limit of the required communication rate is lower than the admissible communication rate, or the admissible communication rate is between the upper limit and the lower limit of the required communication rate, the RRC layer of the base station 20 admits the request for the service by the new application.

After receiving the admission control results, the APP layer of the mobile station 10 may change the required communication rate, or change the request from a quantitatively-guaranteed service to a relatively-guaranteed service, or make another request for a quantitatively-guaranteed service.

Specifically, the APP layer of the mobile station 10 receives both the admission control results and the admissible communication rate, and if the lowest communication rate required by the new application is lower than the admissible communication rate, the APP layer of the mobile station 10 changes the required communication rate to the admissible communication rate. Then, the APP layer of the mobile station 10 sends a reply indicating permission of the admissible communication rate to the RRC layer of the base station 20. In response to the reply, the RRC layer of the base station 20 admits the request for the service by the new application. Alternatively, the APP layer of the mobile station 10 changes the required communication rate to a value lower than the admissible communication rate but higher than the lowest communication rate required by the new application, and sends the modified communication rate to the RRC layer of the base station 20. Upon receiving the modified communication rate, the RRC layer of the base station 20 admits the request for the service by the new application.

The APP layer of the mobile station 10 receives both the admission control results and the admissible communication rate. If the lowest communication rate required by the new application is higher than the admissible communication rate, or if only the admission control results are received, the APP layer of the mobile station 10 may change the required communication rate, or change the request from a quantitatively-guaranteed service to a relatively-guaranteed service, or make another request for a quantitatively-guaranteed service.

The APP layer of the mobile station 10 may make a request for a service to the base station 20 or change the service at any time during the communications and after a handover.

Figure 5:
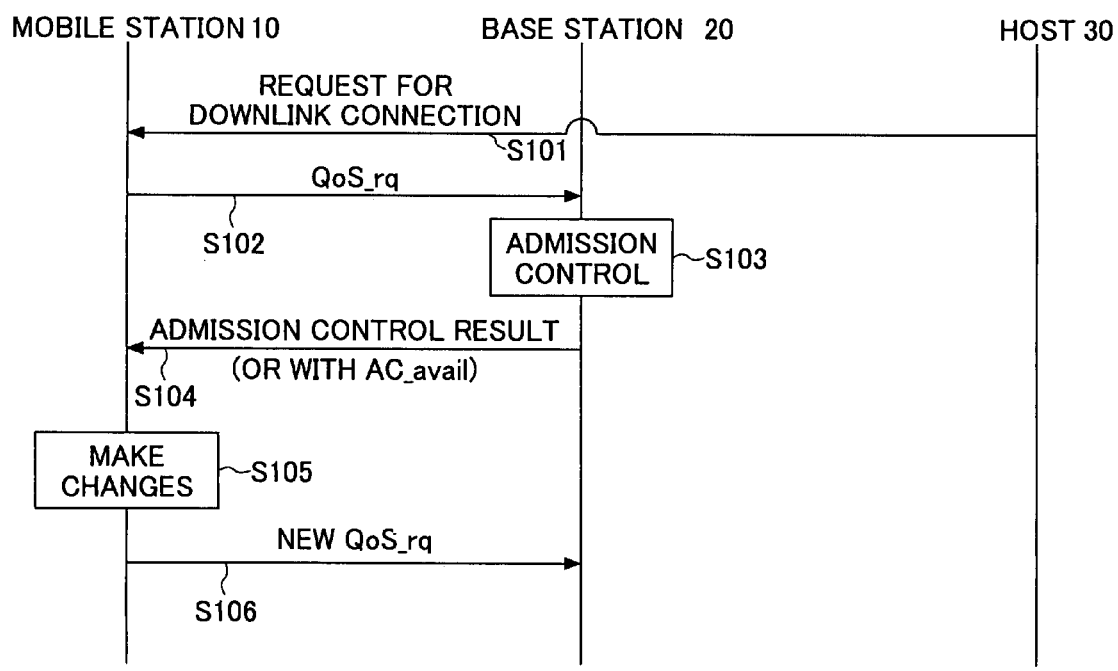
FIG. 5 is a diagram showing a sequence of an operation of data transmission in the downlink direction in a mobile communication system.

FIG. 5 is a diagram showing a sequence of an operation of data transmission in the downlink direction in a mobile communication system.

In step S101, the host 30 sends a request for a downlink connection with the mobile station 10.

In step S102, after receiving the request, the mobile station 10 selects either a quantitatively-guaranteed service or a relatively-guaranteed service as the service to be requested from the base station 20. When requesting a quantitatively-guaranteed service, the mobile station 10 sends the required communication rate to the base station 20.

In step S103, the base station 20 performs admission control in response to the request of a quantitatively-guaranteed service.

In step S104, the base station 20 sends the admission control result to the mobile station 10. If the base station 20 does not admit the request, the base station 20 sends the admission control result together with the admissible communication rate.

In step S105, when the request is rejected, the mobile station 10 changes the required communication rate according to the received admissible communication rate, or changes the request from a quantitatively-guaranteed service to a relatively-guaranteed service, or makes another request for a quantitatively-guaranteed service.

In step S106, when the required communication rate is changed, the mobile station 10 sends the modified communication rate to the base station 20.

Figure 6:
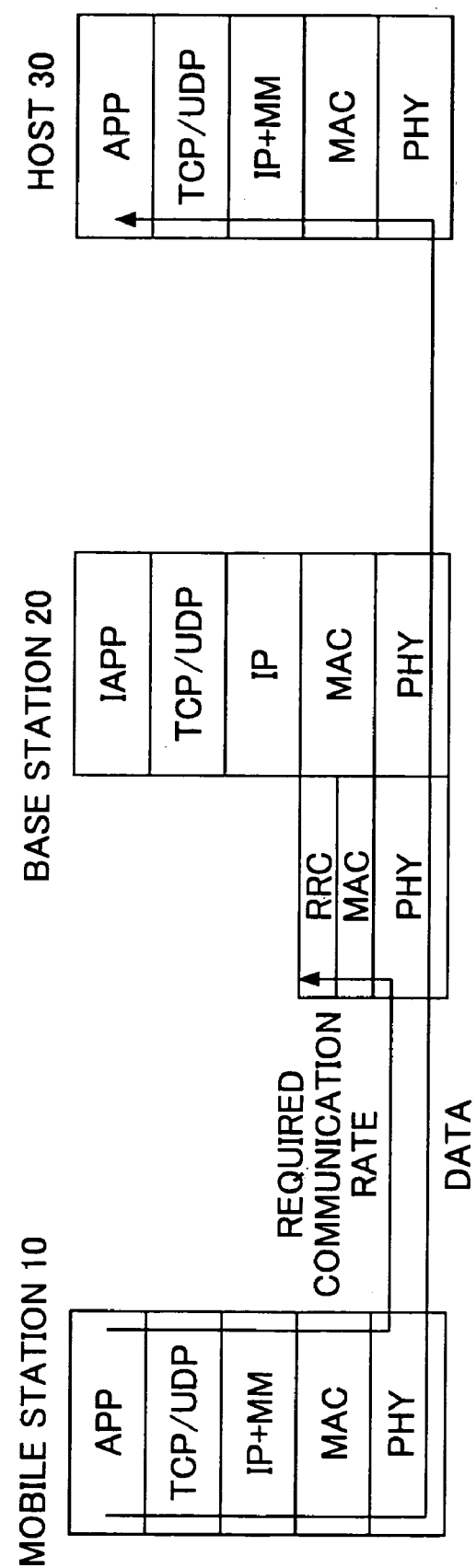
FIG. 6 is a schematic view of another example of a configuration of a mobile communication system according to the embodiment of the present invention from the viewpoint of communication protocols.

FIG. 6 is a schematic view of another example of a configuration of a mobile communication system according to the embodiment of the present invention from the viewpoint of communication protocols. The configuration in FIG. 6 is for uplink data transmission, that is, data transmission from the mobile station 10 to the host 30. As shown in FIG. 6, the mobile station 10, the base station 20 and the host 30 have the same configurations as those shown in FIG. 1.

When sending data in the uplink direction, the APP layer of the mobile station 10 selects either a quantitatively-guaranteed service or a relatively-guaranteed service as the service to be requested from the base station 20 according to the type of the application for data transmission.

When the, APP layer of the mobile station 10 requests a quantitatively-guaranteed service, the APP layer, using a control channel, sends an admission request message including the communication rate required by the new application, that is, the required communication rate.

The APP layer of the mobile station 10 may include only one required communication rate in the admission request message, or an upper limit and a low limit of the required communication rate in the admission request message; alternatively, the APP layer of the mobile station 10 may include identifiers (that is, the QoS-request-bit) that identify the combination of the upper limit and the low limit of the required communication rate in the admission request message.

The RRC layer of the base station 20 measures the amount of the radio resources in the uplink direction actually used by the other applications relevant to the quantitatively-guaranteed service. The measurement method is the same as that described in the case of downlink data transmission.

When transmitting data in the uplink direction, the APP layer of the mobile station 10 sends data to the RRC layer of the base station 20 indicating the propagation quality between them. If the mobile communication system uses the HSDPA (High Speed Downlink Packet Access), the CQI, which indicate the propagation quality, is set according to the propagation quality measured by the RRC layer of the base station 20.

Then, in the same way as in the downlink data transmission, the RRC layer of the base station 20 calculates the assignable radio resources for the new application by subtracting the maximum of the used radio resources from the total radio resources. Alternatively, instead of determining the radio resources used by the other applications, the RRC layer of the base station 20 may determine the radio resources assigned to the other applications when the propagation quality is the lowest between the base station 20 and the mobile station 10 and other mobile stations and subtracts the determined assigned radio resources from the total radio resources to obtain the assignable radio resources for the new application.

Based on the assignable radio resources for the new application, the RRC layer of the base station 20 calculates the communication rate when the propagation quality is the Lowest between the mobile station 10 and the base station 20, that is, admissible communication rate. The RRC layer of the base station 20 compares the admissible communication rate with the required communication rate. Then, based on the comparison result, the RRC layer of the base station 20 determines whether to admit the request for the service by the new application.

If the RRC layer of the base station 20 admits the request, it sends an admission control result to the APP layer of the mobile station 10. Further, the base station 20 assigns a certain amount of radio resources to enable communications at the required communication rate or the admissible communication rate even when the propagation quality is the lowest between the mobile station 10 and the base station 20.

If the RRC layer of the base station 20 does not admit the request, it sends a request rejection message to the APP layer of the mobile station 10 together with the admissible communication rate.

After receiving the admission control results, the APP layer of the mobile station 10 may change the required communication rate, or change the request from a quantitatively-guaranteed service to a relatively-guaranteed service, or make another request for a quantitatively-guaranteed service.

Figure 7:
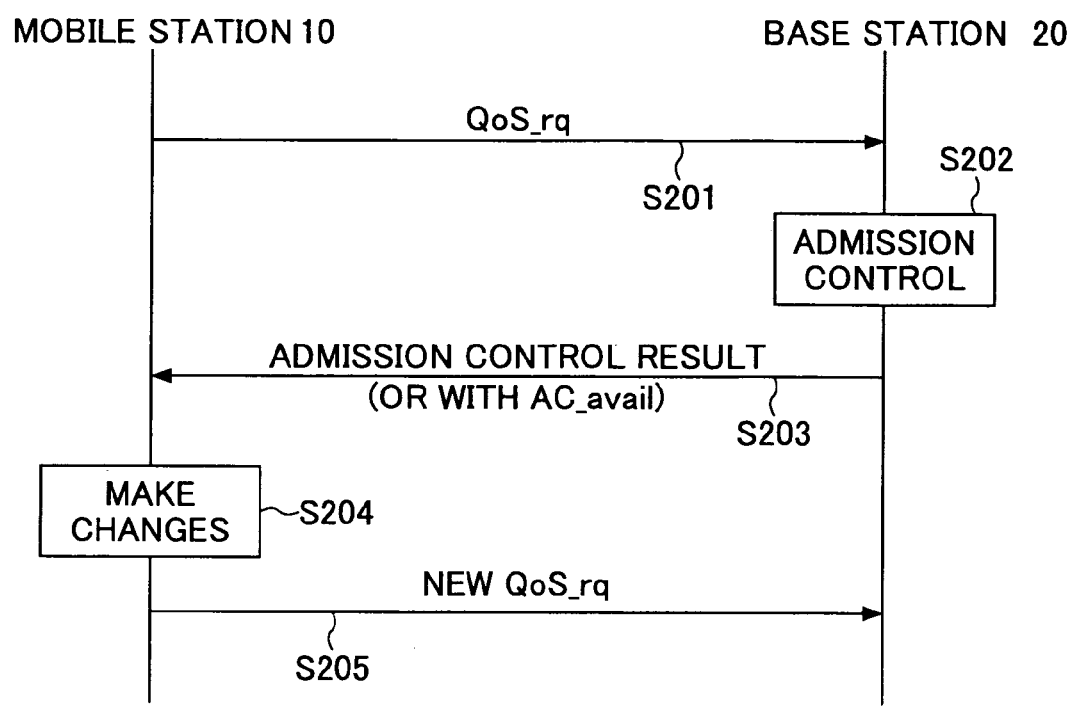
FIG. 7 is a diagram showing a sequence of an operation of data transmission in the uplink direction in a mobile communication system.

FIG. 7 is a diagram showing a sequence of an operation of data transmission in the uplink direction in a mobile communication system.

In step S201, the mobile station 10 selects either a quantitatively-guaranteed service or a relatively-guaranteed service as the service to be requested from the base station 20. When requesting a quantitatively-guaranteed service, the mobile station 10 sends the required communication rate to the base station 20.

In step S202, after receiving the required communication rate, the base station 20 performs admission control in response to the request of a quantitatively-guaranteed service.

In step S203, the base station 20 sends the admission control result to the mobile station 10. If the base station 20 does not admit the request, the base station 20 sends the admission control result together with the admissible communication rate.

In step S204, when the request is rejected, the mobile station 10 changes the required communication rate according to the received admissible communication rate, or changes the request from a quantitatively-guaranteed service to a relatively-guaranteed service, or makes another request for a quantitatively-guaranteed service.

In step S205, when the required communication rate is changed, the mobile station 10 sends the modified communication rate to the base station 20.

Below, preferred specific embodiments of the present invention for accomplishing the above operations are explained.

First Embodiment

Figure 8:
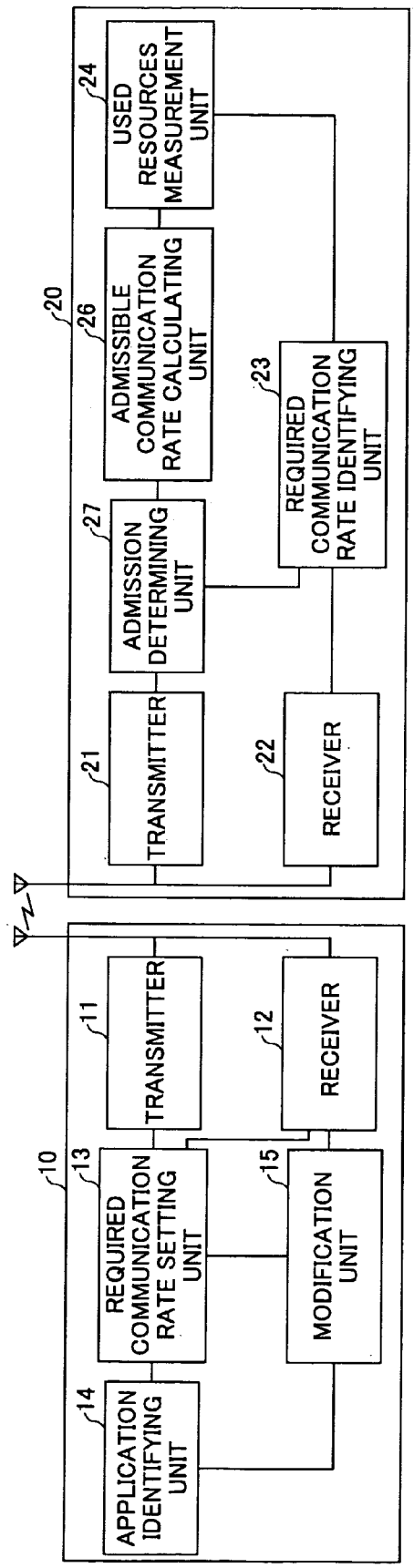
FIG. 8 is a block diagram showing an example of configurations of the mobile station 10 and the base station 20 according to the first embodiment.

FIG. 8 is a block diagram showing an example of configurations of the mobile station 10 and the base station 20 according to the first embodiment.

As shown in FIG. 8, the mobile station 10 includes a transmitter 11, a receiver 12, a required communication rate setting unit 13, an application identifying unit 14, and a modification unit 15. The base station 20 includes a transmitter 21, a receiver 22, a required communication rate identifying unit 23, a used resources measurement unit 24, an admissible communication rate calculating unit 26, and an admission determining unit 27.

In the downlink data transmission, the receiver 12 in the mobile station 10 receives a request from the host 30 for connection with the mobile station 10, and transmits the request to the required communication rate setting unit 13. The application identifying unit 14 identifies the type of a new application for the data transmission, and transmits the results to the required communication rate setting unit 13.

When receiving the connection request from the receiver 12 for transmitting data in the downlink direction, or when receiving a direction from a user in the uplink data transmission direction, the required communication rate setting unit 13 selects either a quantitatively-guaranteed service or a relatively-guaranteed service as the service to be requested from the base station 20 according to the type of the new application for the data transmission.

When requesting a quantitatively-guaranteed service, the required communication rate setting unit 13 sets one required communication rate and sends the required communication rate to the transmitter 11. The transmitter 11, using a control channel, sends an admission request message including the required communication rate to the base station 20.

The receiver 22 in the base station 20 receives the admission request message from the mobile station 10, and transmits the message to the required communication rate identifying unit 23.

The required communication rate identifying unit 23 determines the required communication rate in the admission request message, and notifies the admission determining unit 27 of the required communication rate. In addition, the required communication rate identifying unit 23 notifies the used resources measurement unit 24 that an admission request message is received.

Upon receiving the notification, the used resources measurement unit 24 measures the maximum of the radio resources actually used by the other applications in a certain period among the radio resources assigned to other applications corresponding to the quantitatively-guaranteed service. The used resources measurement unit 24 then sends the maximum of the used radio resources to the admissible communication rate calculating unit 26.

The admissible communication rate calculating unit 26 calculates the assignable radio resources for the new application by subtracting the maximum of the used radio resources from the total radio resources. In addition, the admissible communication rate calculating unit 26 calculates the admissible communication rate, that is, the communication rate when the propagation quality is the lowest between the base station 20 and the mobile station 10, based on the assignable radio resources for the new application. The admissible communication rate calculating unit 26 then transmits the obtained admissible communication rate to the admission determining unit 27.

The admission determining unit 27 compares the admissible communication rate transmitted from the admissible communication rate calculating unit 26 with the required communication rate transmitted from the required communication rate identifying unit 23. If the required communication rate is not higher than the admissible communication rate, the admission determining unit 27 admits the request for the service by the new application, assigns an amount of radio resources that enables communications at the required communication rate even when the propagation quality is the lowest between the mobile station 10 and the base station 20. The admission determining unit 27 sends an admission control result to the mobile station 10 via the transmitter 21.

If the required communication rate is higher than the admissible communication rate, the admission determining unit 27 does not admit the request for the service by the new application, and sends a request rejection message together with the admissible communication rate to the mobile station 10 via the transmitter 21.

When the receiver 12 in the mobile station 10 receives the admissible communication rate from the base station 20, it sends the admissible communication rate to the modification unit 15.

The modification unit 15 is capable of changing the required communication rate based on the admissible communication rate, or changing the request from a quantitatively-guaranteed service to a relatively-guaranteed service.

Figure 9:
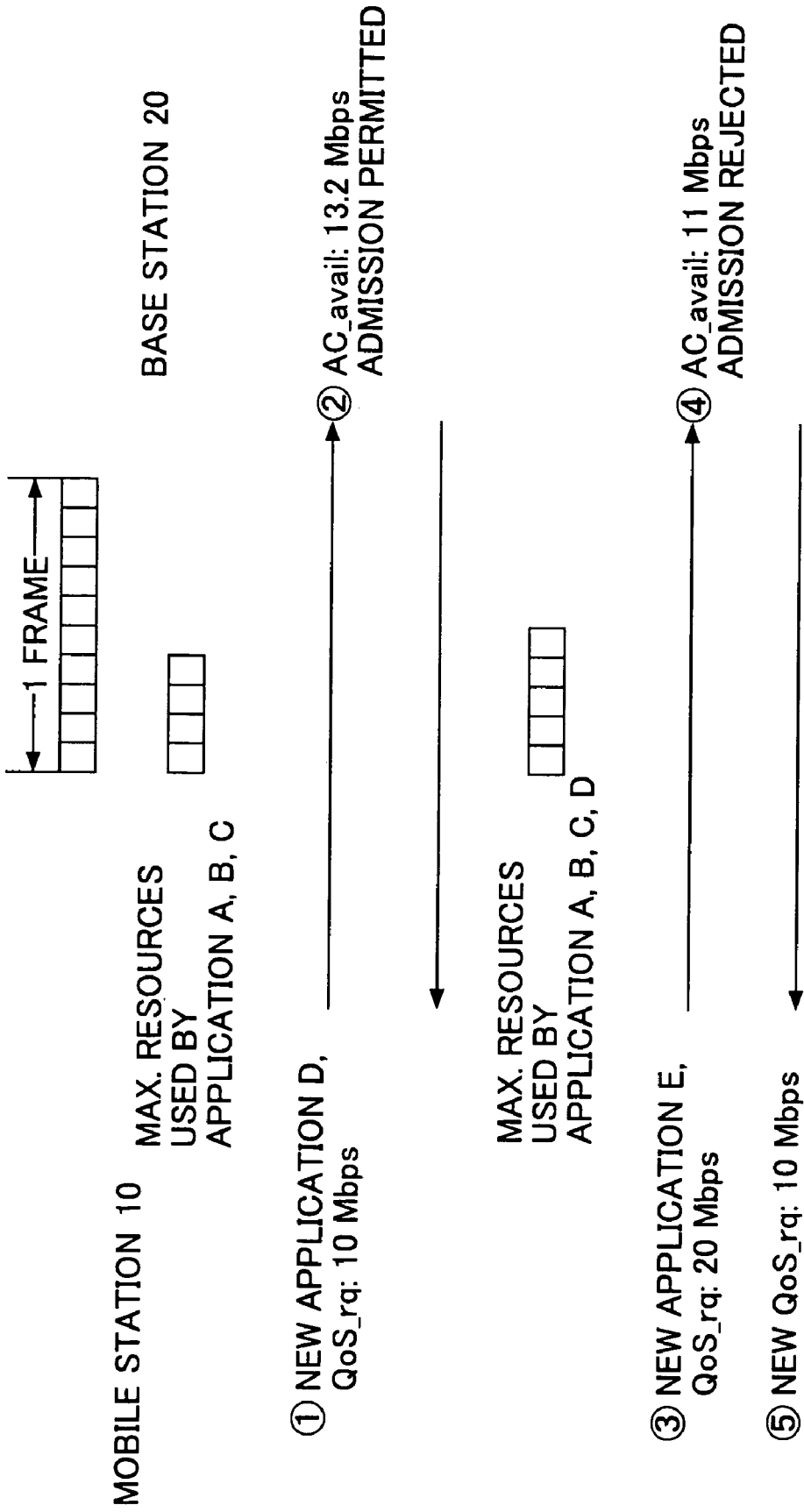
FIG. 9 is a data diagram showing an example of the operations of the mobile station 10 and the base station 20 in the downlink data transmission direction according to the first embodiment.

FIG. 9 is a data diagram showing an example of the operations of the mobile station 10 and the base station 20 in the downlink data transmission direction according to the first embodiment.

In FIG. 9, it is assumed that the radio resources are managed in terms of frames, one frame consists of ten slots, and the factor $\alpha$ multiplied by the maximum of the used radio resources equals one. Further, it is assumed that the modulation and coding scheme used in communications in the mobile station 10 is QPSK1/2 when the propagation quality is the lowest between the mobile station 10 and the base station 20, and the transmission rate in QPSK1/2 for one slot is 2.2 Mbps.

As shown in FIG. 9, the maximum of the radio resources used by applications A, B, and C corresponds to four slots, and under this condition, the mobile station 10 calls a new application D, and notifies the base station 20 of a communication rate of 10 Mbps as the required communication rate, that is, the communication rate required by the new application D.

The base station 20 subtracts the maximum of the used radio resources (four slots) from the total radio resources (ten slots), and the obtained result (six slots) is the maximum assignable radio resources for the new application D.

Further, the base station 20 calculates the admissible communication rate for the application D in the following way. Since the transmission rate for one slot is 2.2 Mbps when the propagation quality is the lowest between the mobile station 10 and the base station 20, the admissible communication rate for six slots is six multiplied by 2.2, and the product 13.2 Mbps is the admissible communication rate with the lowest propagation quality. This admissible communication rate of 13.2 Mbps is greater than the required communication rate of 10 Mbps. Therefore, the base station 20 admits the request for the service by the new application D, and assigns an amount of radio resources (here, five slots) to the new application D to enable communications at the required communication rate of 10 Mbps in the mobile station 10 even at places where the propagation quality is the lowest between the mobile station 10 and the base station 20. Then the base station 20 sends an admission permission message to the mobile station 10.

Subsequently, the maximum of the radio resources used by applications A, B, C, and D corresponds to five slots. Under this condition, the mobile station 10 calls a new application E, and notifies the base station 20 of a communication rate of 20 Mbps as that required by the new application E, that is, the required communication rate.

The base station 20 subtracts the maximum of the used radio resources (five slots) from the total radio resources (ten slots), and the obtained result (five slots) is the maximum assignable radio resources for the new application E.

Further, the base station 20 calculates the admissible communication rate for the application E when the propagation quality is the lowest between the mobile station 10 and the base station 20. Specifically, since the transmission rate for one slot is 2.2 Mbps when the propagation quality is the lowest between the mobile station 10 and the base station 20, the admissible communication rate for five slots is five multiplied by 2.2, and the product 11 Mbps is the admissible communication rate with the lowest propagation quality. This admissible communication rate of 11 Mbps is less than the required communication rate of 20 Mbps. Therefore, the base station 20 does not admit the request for the service by the new application E, and notifies the mobile station 10 of the admissible communication rate of 11 Mbps. The mobile station 10 notifies the base station 20 of a new required communication rate not higher than the admissible communication rate of 11 Mbps, for example, 10 Mbps.

Figure 10:
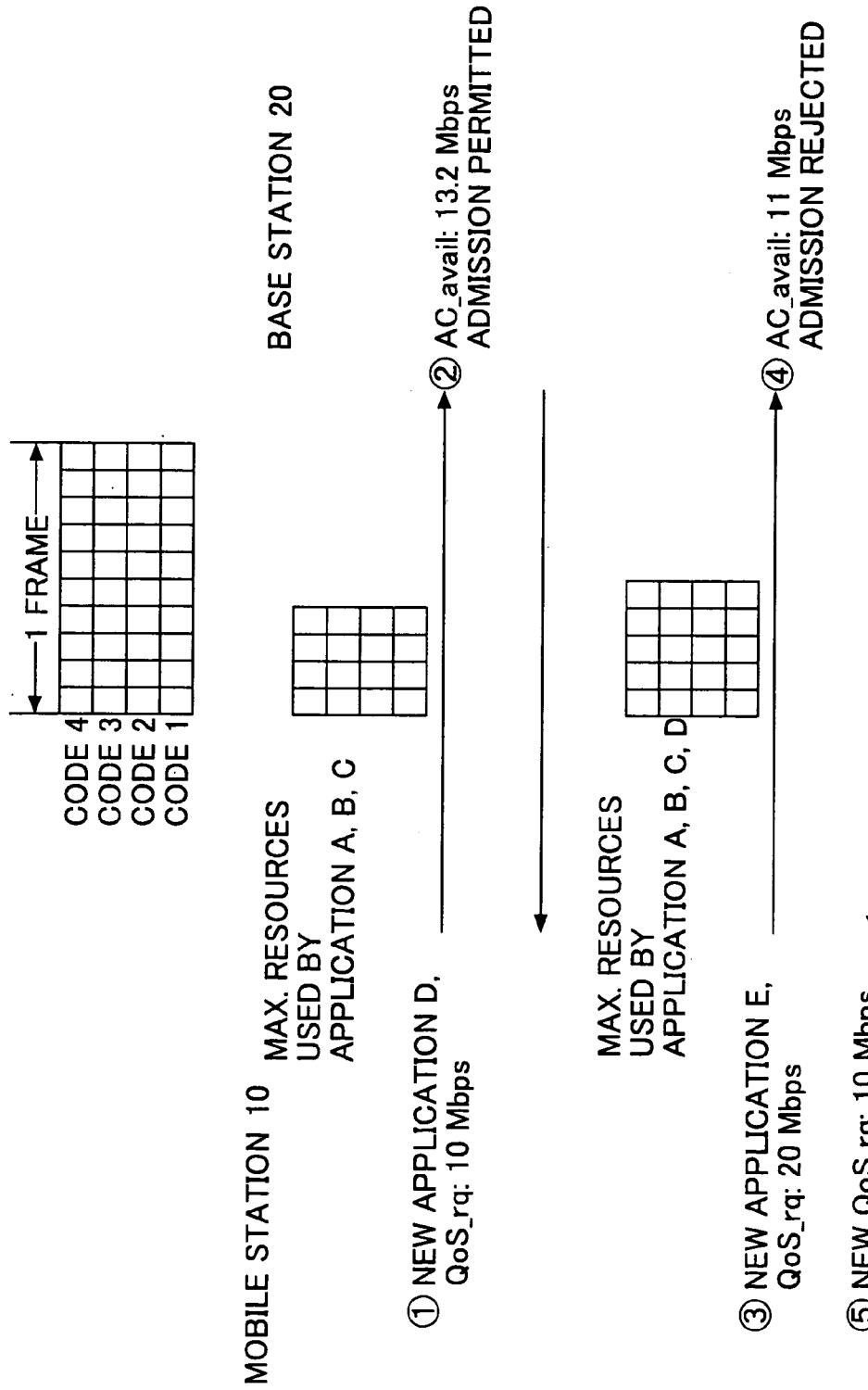
FIG. 10 is a data diagram showing an example of the operations of the mobile station 10 and the base station 20 in the uplink data transmission direction according to the first embodiment.

FIG. 10 is a data diagram showing an example of the operations of the mobile station 10 and the base station 20 in the uplink data transmission direction according to the first embodiment.

In FIG. 10, it is assumed that the radio resources are managed in terms of frames, one frame consists of ten slots, and code 1 through code 4 are multiplexed. The factor α multiplied by the maximum of the used radio resources equals one. Further, it is assumed that the modulation and coding scheme used in communications in the mobile station 10 is QPSK1/2 when the propagation quality is the lowest between the mobile station 10 and the base station 20, and the transmission rate in QPSK1/2 for one slot is 550 kbps.

As shown in FIG. 10, the maximum of the radio resources used by applications A, B, and C correspond to sixteen slots, and the mobile station 10 calls a new application D, and notifies the base station 20 of a communication rate of 10 Mbps as that required by the new application D, that is, the required communication rate for the new application D.

The base station 20 subtracts the maximum of the used radio resources (sixteen slots) from the total radio resources (forty slots), and the obtained result (twenty-four slots) is the maximum assignable radio resources for the new application D.

Further, the base station 20 calculates the admissible communication rate for the application D when the propagation quality is the lowest between the mobile station 10 and the base station 20. Specifically, the transmission rate for one slot is 550 kbps when the propagation quality is the lowest between the mobile station 10 and the base station 20, the admissible communication rate for twenty-four slots is 24 multiplied by 550 kbps, and the product 13.2 Mbps is the admissible communication rate with the lowest propagation quality. This admissible communication rate of 13.2 Mbps is greater than the required communication rate of 10 Mbps. Therefore, the base station 20 admits the request for the service by the new application D, and assigns an amount of radio resources (here, nineteen slots) to the new application D to enable communications at the required communication rate of 10 Mbps in the mobile station 10 even at places where the propagation quality is the lowest between the mobile station 10 and the base station 20.

Subsequently, the maximum of the radio resources used by applications A, B, C, and D corresponds to twenty slots. Under this condition, the mobile station 10 calls a new application E, and notifies the base station 20 of a communication rate of 20 Mbps as that required by the new application E, that is, the required communication rate for the new application E.

The base station 20 subtracts the maximum of the used radio resources (twenty slots) from the total radio resources (forty slots), and the obtained result (twenty slots) is the maximum assignable radio resources for the new application E.

Further, the base station 20 calculates the admissible communication rate for the application E in the following way. Since the transmission rate for one slot is 550 kbps when the propagation quality is the lowest between the mobile station 10 and the base station 20, the admissible communication rate for twenty slots is twenty multiplied by 550 kbps, and the product 11 Mbps is the admissible communication rate with the lowest propagation quality. This admissible communication rate of 11 Mbps is less than the required communication rate of 20 Mbps. Therefore, the base station 20 does not admit the request for the service by the new application E, and notifies the mobile station 10 of the admissible communication rate of 11 Mbps. The mobile station 10 notifies the base station 20 of a new required communication rate not higher than the admissible communication rate of 11 Mbps, for example, 10 Mbps.

Figure 11:
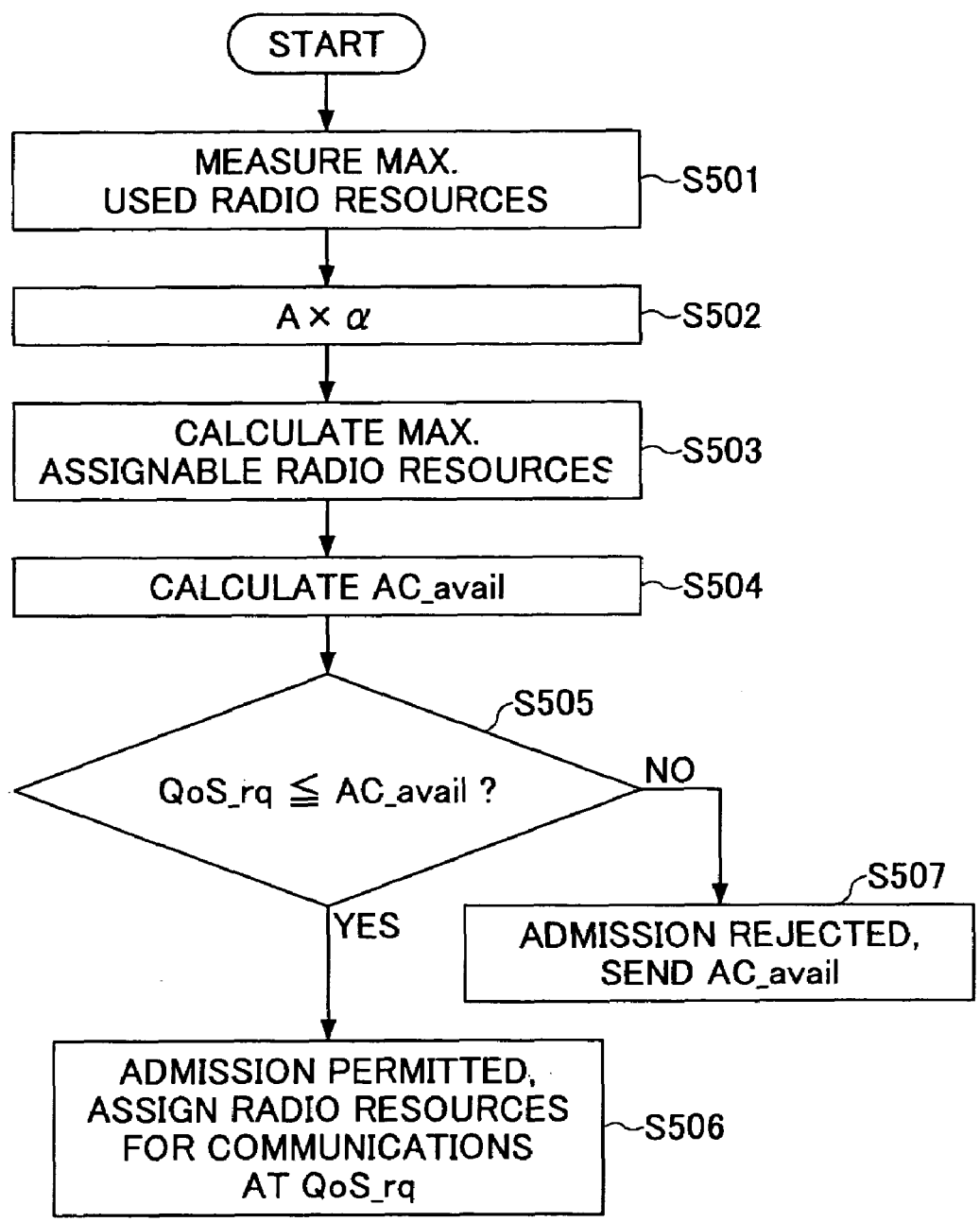
FIG. 11 is a flowchart showing the operation of the base station 20 according to the first embodiment.

FIG. 11 is a flowchart showing the operation of the base station 20 according to the first embodiment.

In step S501, after the mobile station 10 calls a new application and sends the required communication rate, the base station 20 measures the maximum of the used radio resources.

In step S502, the base station 20 multiplies a factor α by the maximum of the used radio resources.

In step S503, the base station 20 subtracts the maximum of the used radio resources multiplied by the factor α from the total radio resources and obtains the maximum assignable radio resources for the new application.

In step S504, the base station 20 calculates the admissible communication rate (AC_avail) for the new application when the propagation quality is the lowest between the mobile station 10 and the base station 20 based on the maximum assignable radio resources for the new application.

In step S505, the base station 20 determines whether the required communication rate (QoS_rq) for the new application is less than or equal to the admissible communication rate.

In step S506, if the required communication rate for the new application is less than or equal to the admissible communication rate, the base station 20 admits the request for the service by the new application, and assigns an amount of radio resources to the new application to enable communications at the required communication rate even at places where the propagation quality is the lowest between the mobile station 10 and the base station 20. Then the base station 20 sends an admission permission message to the mobile station 10.

In step S507, if the required communication rate for the new application is higher than the admissible communication rate, the base station 20 does not admit the request for the service by the new application, and sends a request rejection message and the admissible communication rate to the mobile station 10.

Figure 12:
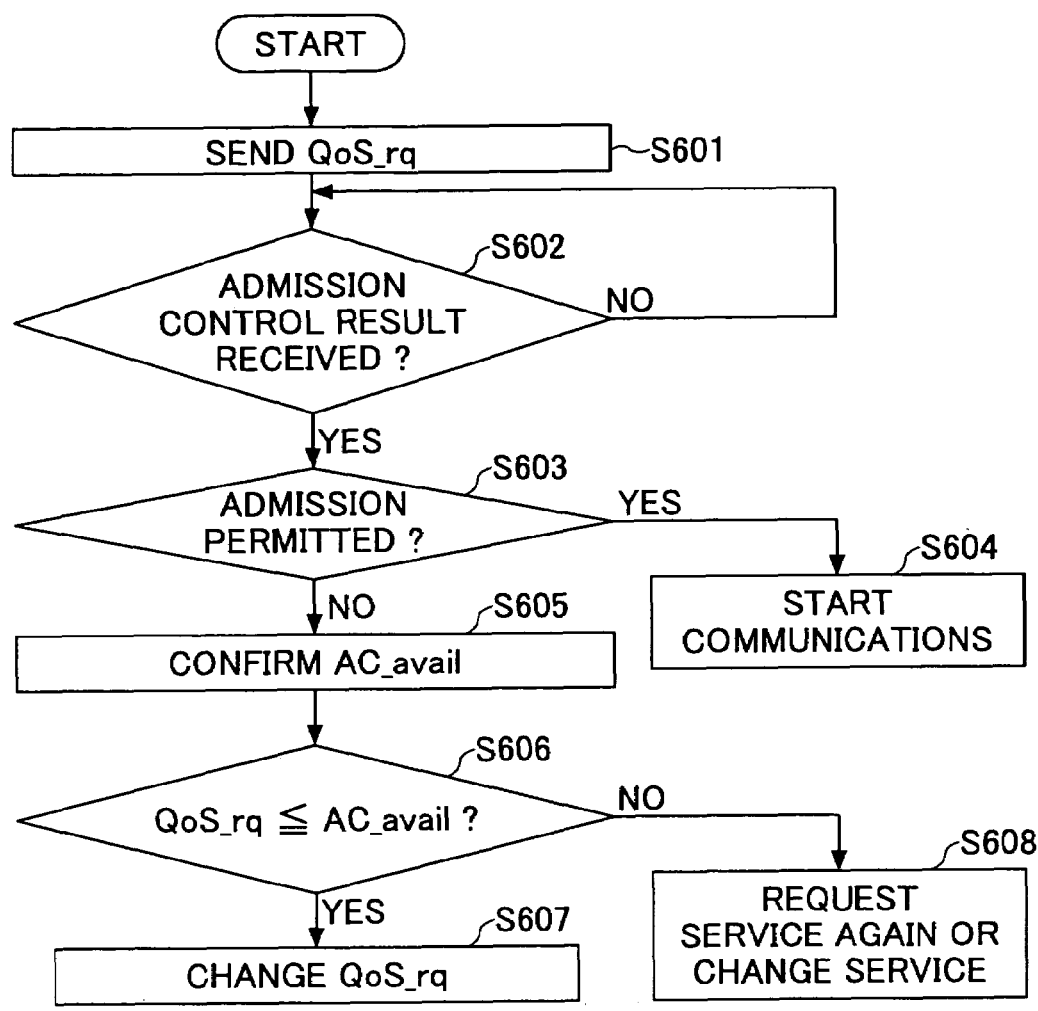
FIG. 12 is a flowchart showing the operation of the mobile station 10 according to the first embodiment.

FIG. 12 is a flowchart showing the operation of the mobile station 10 according to the first embodiment.

In step S601, when the mobile station 10 requests a quantitatively-guaranteed service after calling a new application, the mobile station 10 sends the required communication rate to the base station 20.

In step S602, the mobile station 10 determines whether the admission control result is received from the base station 20.

In step S603, if the admission control result is received, the mobile station 10 determines whether the admission control result indicates permission of admission of the request.

In step S604, if the admission control result indicates that admission of the request is permitted, the mobile station 10 starts communications using the radio resources assigned to the new application.

In step S605, when the admission control result indicates that admission of the request is rejected, the mobile station 10 confirms the admissible communication rate sent together with the admission control result.

In step S606, the mobile station 10 determines whether the lowest communication rate required by the new application (QoS_rqmin) is less than or equal to the admissible communication rate.

In step S607, when the smallest communication rate required by the new application is less than or equal to the admissible communication rate, the mobile station 10 changes the required communication rate to the admissible communication rate.

In step S608, when the smallest communication rate required by the new application is greater than the admissible communication rate, the mobile station 10 changes the request from a quantitatively-guaranteed service to a relatively-guaranteed service, or makes another request for a quantitatively-guaranteed service.

Second Embodiment

The configurations of the mobile station and the base station of the second embodiment are the same as those of the mobile station 10 and the base station 20 of the first embodiment as shown in FIG. 8, except for the following differences. In the following, the same numeral references are used as in the first embodiment.

The required communication rate-setting unit 13 sets an upper limit and a lower limit of the required communication rate when requesting a quantitatively-guaranteed service.

Further, the admission determining unit 27 in the base station 20 compares the admissible communication rate with the upper limit and the lower limit of the required communication rate. If the upper limit of the required communication rate is less than or equal to the admissible communication rate, the admission determining unit 27 admits the request for the service by the new application, and assigns an amount of radio resources that enables communications at the required communication rate even when the propagation quality is the lowest between the mobile station 10 and the base station 20.

If the admissible communication rate is between the lower limit and the upper limit of the required communication rate, the admission determining unit 27 admits the request for the service by the new application, and assigns an amount of radio resources that enables communications at the required communication rate even when the propagation quality is the lowest between the mobile station 10 and the base station 20.

If the admissible communication rate is lower than the lower limit of the required communication rate, the admission determining unit 27 does not admit the request for the service by the new application; the admission determining unit 27 sends a request rejection message together with the admissible communication rate to the mobile station 10 via the transmitter 21.

Figure 13:
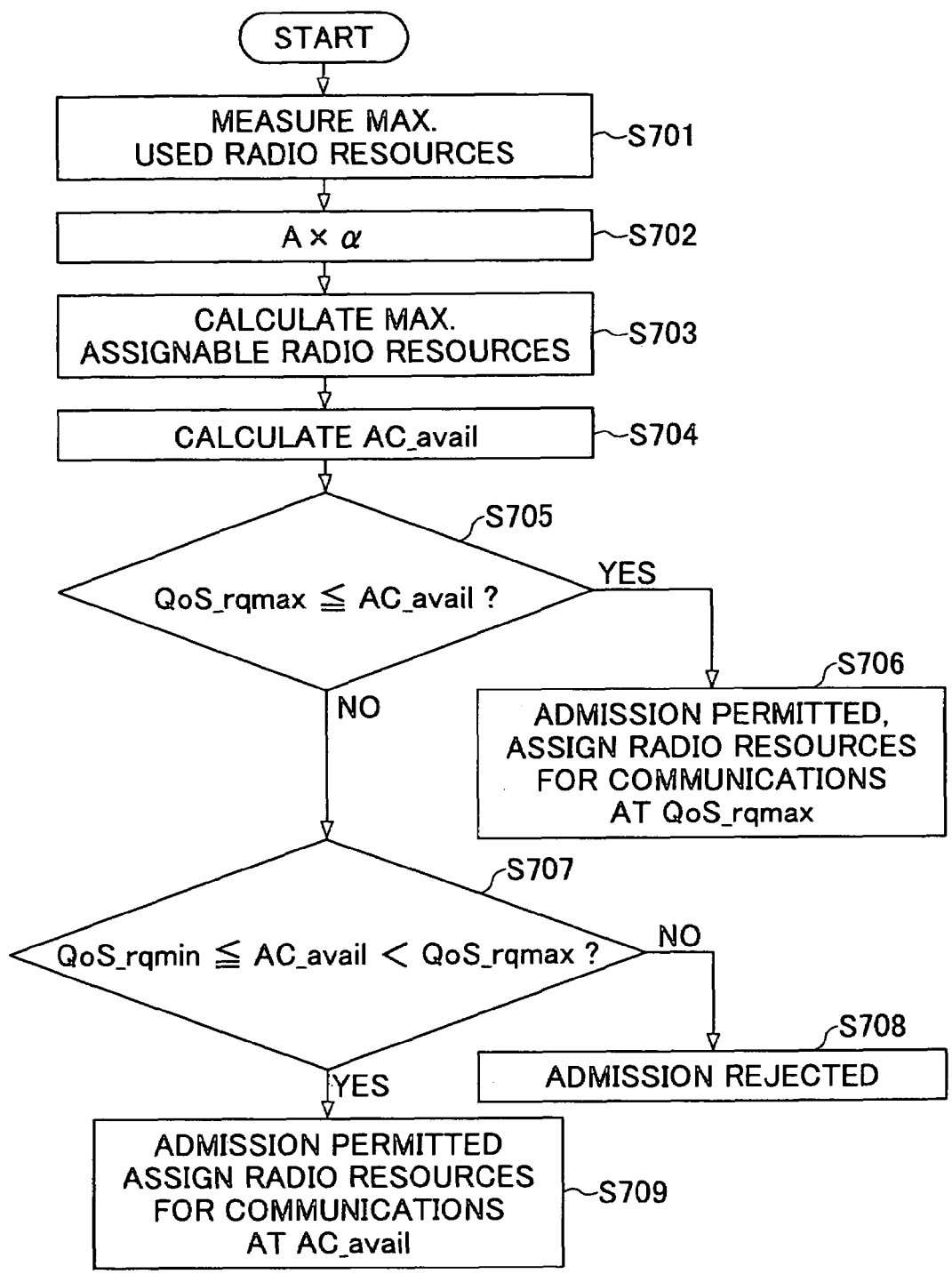
FIG. 13 is a flowchart showing the operation of the base station 20 according to the second embodiment.

FIG. 13 is a flowchart showing the operation of the base station 20 according to the second embodiment. As shown below, the step S701 through step S704 are the same as the step S501 through step S504.

In step S701, after the mobile station 10 calls a new application and sends the required communication rate, the base station 20 measures the maximum of the used radio resources.

In step S702, the base station 20 multiplies a factor α by the maximum of the used radio resources.

In step S703, the base station 20 subtracts the maximum of the used radio resources multiplied by the factor α from the total radio resources and obtains the maximum assignable radio resources for the new application.

In step S704, the base station 20 calculates the admissible communication rate for the application E when the propagation quality is the lowest between the mobile station 10 and the base station 20 based on the maximum assignable radio resources for the new application.

In step S705, the base station 20 determines whether the highest required communication rate (that is, the upper limit) for the new application is less than the admissible communication rate.

In step S706, if the highest required communication rate for the new application is less than the admissible communication rate, the base station 20 admits the request for the service by the new application, and assigns an amount of radio resources to the new application to enable communications at the highest required communication rate even at places where the propagation quality is the lowest between the mobile station 10 and the base station 20. Then the base station 20 sends an admission permission message to the mobile station 10.

In step S707, if the highest required communication rate for the new application is higher than the admissible communication rate, the base station 20 determines if the admissible communication rate is between the lower limit and the upper limit of the required communication rate.

In step S708, if the admissible communication rate is out of the range between the lower limit and the upper limit of the required communication rate, the base station 20 does not admit the request for the service by the new application, and sends a request rejection message and the admissible communication rate to the mobile station 10.

In step S709, if the admissible communication rate is between the lower limit and the upper limit of the required communication rate, the base station 20 admits the request for the service by the new application, and assigns an amount of radio resources to the new application to enable communications at the admissible communication rate even at places where the propagation quality is the lowest between the mobile station 10 and the base station 20. Then the base station 20 sends an admission permission message to the mobile station 10.

Figure 14:
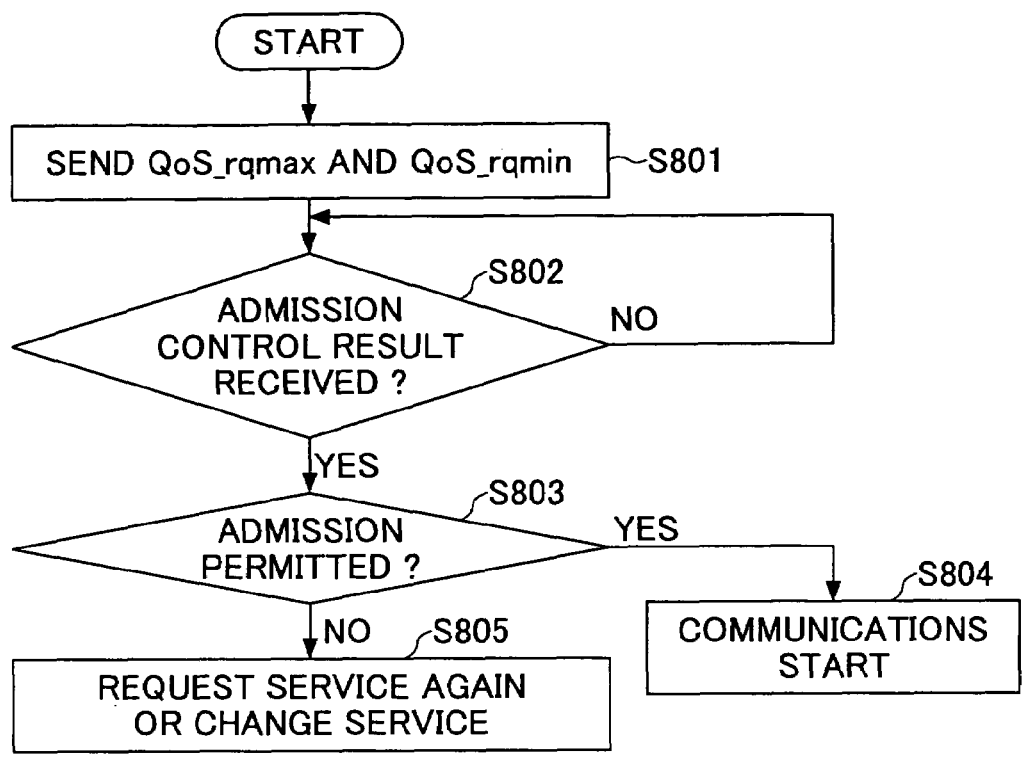
FIG. 14 is a flowchart showing the operation of the mobile station 10 according to the second embodiment.

FIG. 14 is a flowchart showing the operation of the mobile station 10 according to the second embodiment.

In step S801, when the mobile station 10 requests a quantitatively-guaranteed service after calling a new application, the mobile station 10 sends the highest and lowest required communication rates to the base station 20.

In step S802, the mobile station 10 determines whether the admission control result is received from the base station 20.

In step S803, if the admission control result is received, the mobile station 20 determines whether the admission control result indicates permission of admission of the request.

In step S804, if the admission control result indicates that admission of the request is permitted, the mobile station 10 starts communications using the radio resources assigned to the new application.

In step S805, if the admission control result indicates that admission of the request is rejected, the mobile station 10 changes the request from a quantitatively-guaranteed service to a relatively-guaranteed service, or makes another request for a quantitatively-guaranteed service.

Third Embodiment

Figure 15:
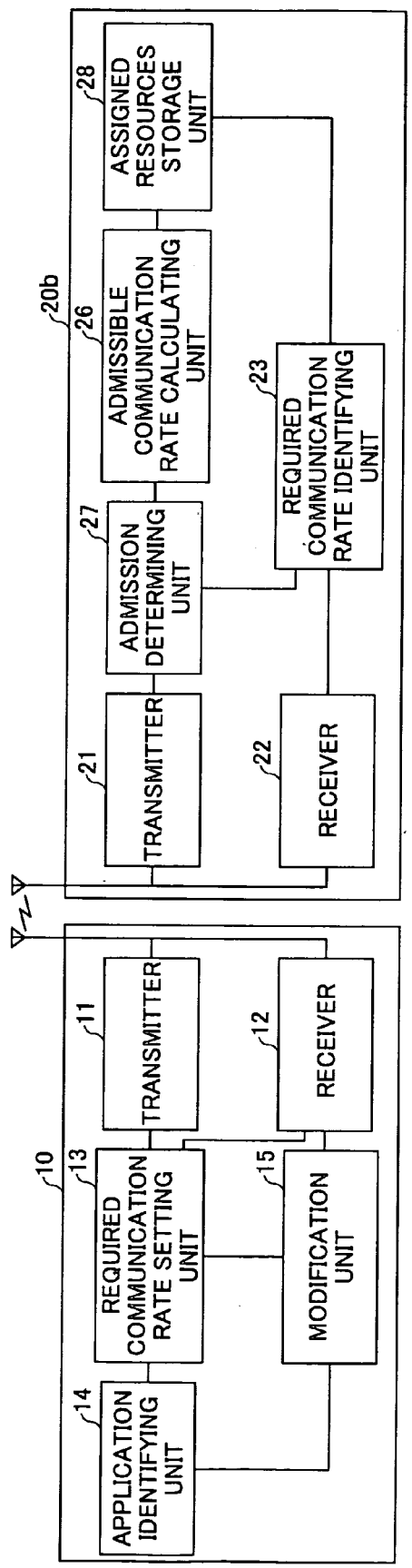
FIG. 15 is a block diagram showing an example of configurations of the mobile station 10 and the base station 20b according to the third embodiment.

FIG. 15 is a block diagram showing an example of configurations of the mobile station 10 and the base station 20b according to the third embodiment.

Comparing the base station 20 shown in FIG. 8 and the base station 20b shown in FIG. 15, it can be found that the base station 20b includes an assigned resources storage unit 28 instead of the used resources measurement unit 24.

When the propagation quality is the lowest between the base station 20b and the mobile station 10, and where the other applications for the quantitatively-guaranteed service are called for other mobile stations, the storage unit 28 stores the radio resources assigned to the other applications. The radio resources assigned to the other applications are referred to as "assigned radio resources" below.

The assigned resources storage unit 28 sends the assigned radio resources to the admissible communication rate calculating unit 26, when the assigned resources storage unit 28 is notified by the required communication rate identifying unit 23 that the required communication rate identifying unit 23 has received an admission request message.

The admissible communication rate calculating unit 26 calculates the assignable radio resources for the new application by subtracting the assigned radio resources from the total radio resources. In addition, the admissible communication rate calculating unit 26 calculates the admissible communication rate when the propagation quality is the lowest between the base station 20b and the mobile station 10 based on the assignable radio resources for the new application. The other operations of the assigned resources storage unit 28 and the admissible communication rate calculating unit 26 are the same as those described in the first embodiment.

Figure 16:
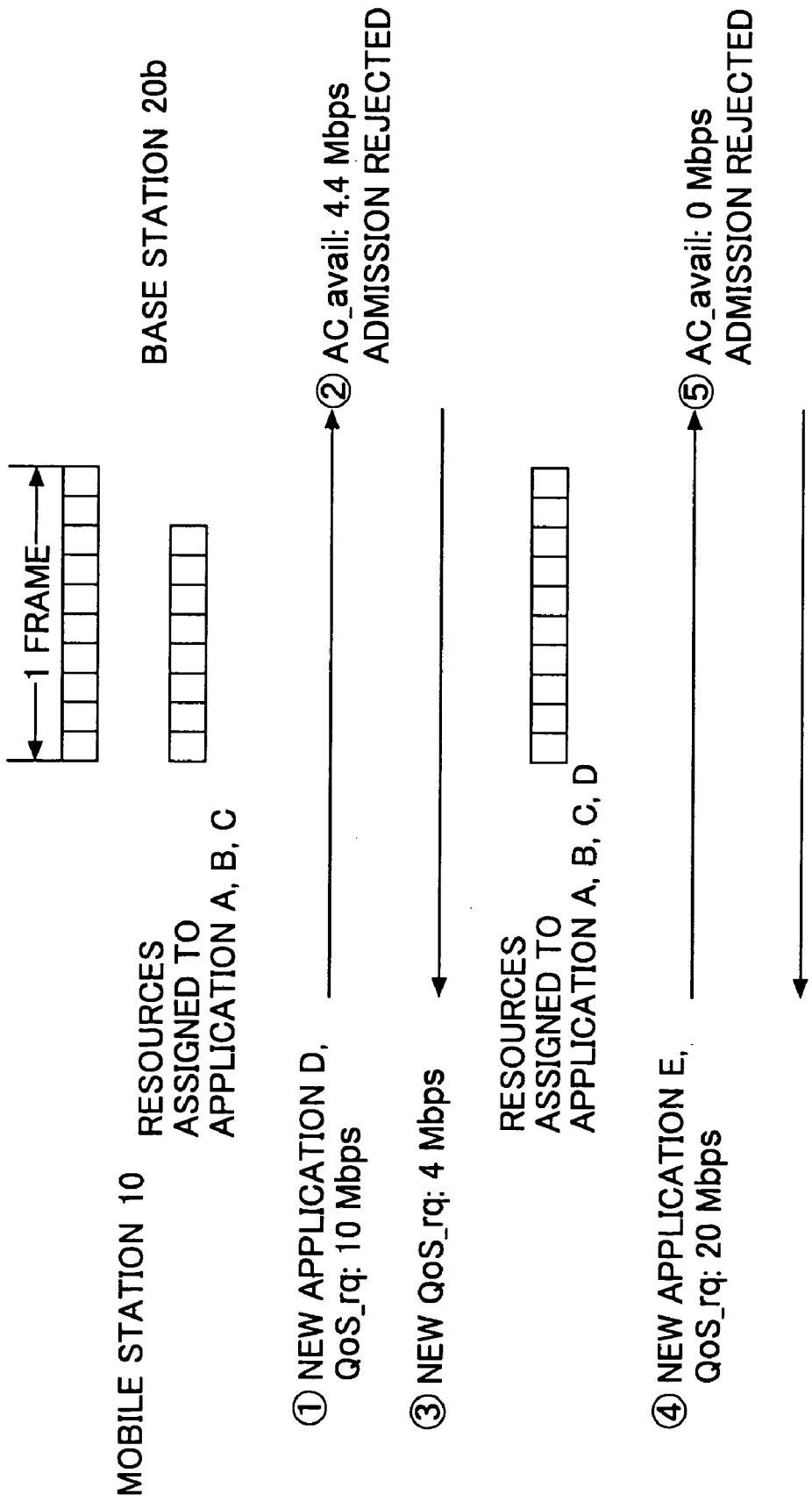
FIG. 16 is a data diagram showing an example of the operations of the mobile station 10 and the base station 20b in the downlink data transmission direction according to the third embodiment.

FIG. 16 is a data diagram showing an example of the operations of the mobile station 10 and the base station 20b in the downlink data transmission direction according to the third embodiment.

In FIG. 16, it is assumed that the radio resources are managed in terms of frames, one frame consists of ten slots, and the factor β multiplying the assigned radio resources equals one. Further, it is assumed that the modulation and coding scheme used in communications in the mobile station 10 is QPSK1/2 when the propagation quality is the lowest between the mobile station 10 and the base station 20b, and the transmission rate in QPSK1/2 for one slot is 2.2 Mbps.

As shown in FIG. 16, the radio resources assigned to applications A, B, and C correspond to eight slots. Under this condition, the mobile station 10 calls a new application D, and notifies the base station 20b of a communication rate of 10 Mbps as that required by the new application D, that is, the required communication rate for the new application D.

The base station 20b subtracts the assigned radio resources (eight slots) from the total radio resources (ten slots), and the obtained result (two slots) is the maximum assignable radio resources for the new application D.

Further, the base station 20b calculates the admissible communication rate for the application D in the following way. Since the transmission rate for one slot is 2.2 Mbps when the propagation quality is the lowest between the mobile station 10 and the base station 20, the admissible communication rate for two slots is two multiplied by 2.2, and the product 4.4 Mbps is the admissible communication rate with the lowest propagation quality.

This admissible communication rate of 4.4 Mbps is less than the required communication rate of 10 Mbps. Therefore, the base station 20b does not admit the request for the service by the new application D, and notifies the mobile station 10 of the admissible communication rate of 4.4 Mbps. The mobile station 10 notifies the base station 20b of a new required communication rate not higher than the admissible communication rate of 4.4 Mbps, for example, 4 Mbps. This required communication rate of 4 Mbps is less than the admissible communication rate of 4.4 Mbps. Therefore, the base station 20b admits the request for the service by the new application D, and assigns an amount of radio resources (here, two slots) to the new application D to enable communications at the required communication rate of 4 Mbps in the mobile station 10 even at places where the propagation quality is the lowest between the mobile station 10 and the base station 20. Then the base station 20b sends an admission permission message to the mobile station 10.

Subsequently, the radio resources assigned to the applications A, B, C, and D correspond to ten slots. Under this condition, the mobile station 10 calls a new application E, and notifies the base station 20b of a communication rate of 20 Mbps as that required by the new application E, that is, the required communication rate for the new application E.

The base station 20b subtracts the assigned radio resources (ten slots) from the total radio resources (ten slots), and the result is zero. Therefore, the base station 20b does not admit the request for the service by the new application E.

Figure 17:
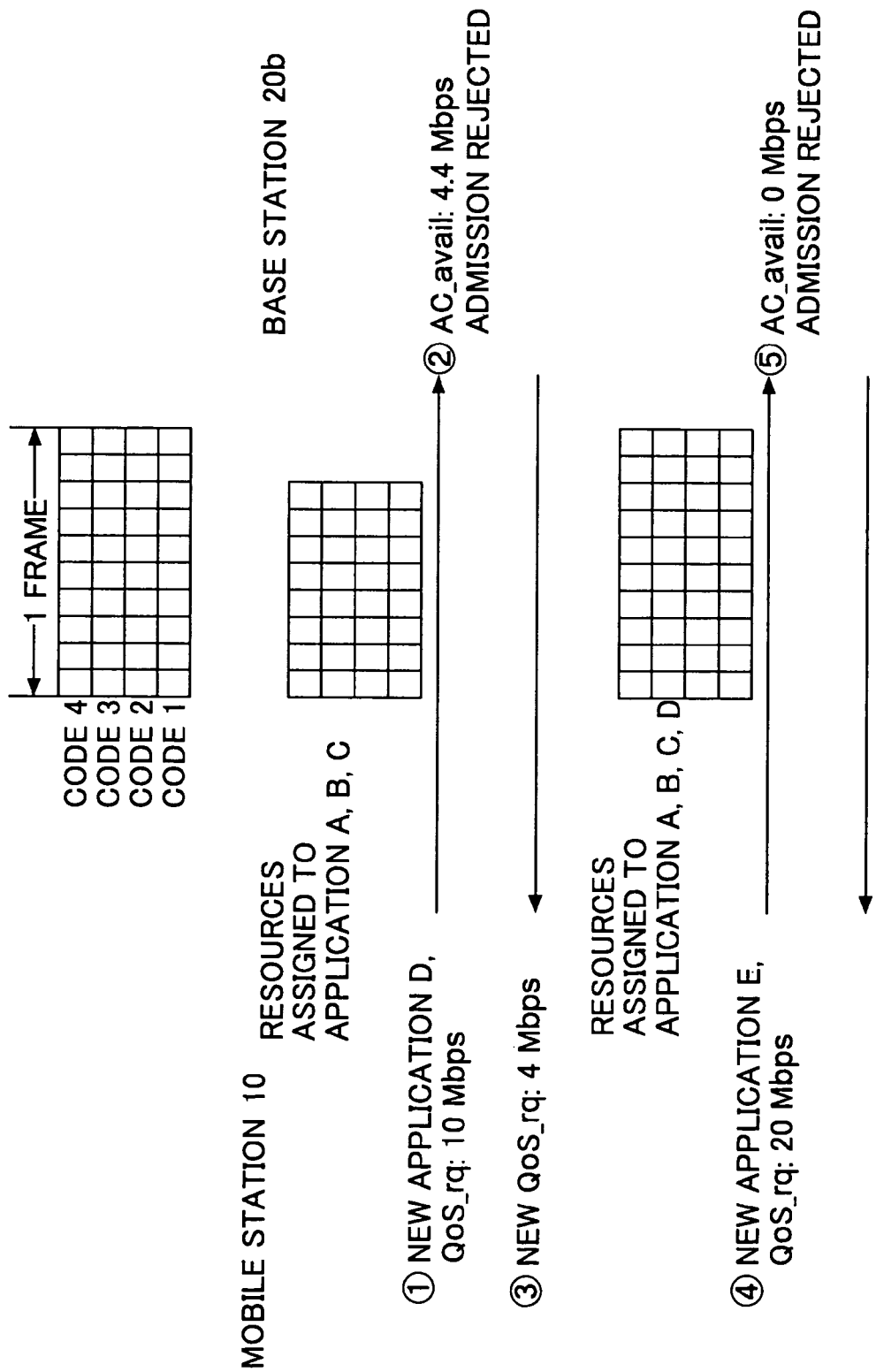
FIG. 17 is a data diagram showing an example of the operations of the mobile station 10 and the base station 20b in the uplink data transmission direction according to the third embodiment.

FIG. 17 is a data diagram showing an example of the operations of the mobile station 10 and the base station 20b in the uplink data transmission direction according to the third embodiment.

In FIG. 17, it is assumed that the radio resources are managed in terms of frames, one frame consists of ten slots, and code 1 through code 4 are multiplexed. The factor β multiplying the assigned radio resources equals one. Further, it is assumed that the modulation and coding scheme used in communications in the mobile station 10 is QPSK1/2 when the propagation quality is the lowest between the mobile station 10 and the base station 20b, and the transmission rate in QPSK1/2 for one slot is 550 kbps.

As shown in FIG. 17, the assigned radio resources to applications A, B, and C correspond to thirty-two slots, and the mobile station 10 calls a new application D, and notifies the base station 20b of a communication rate of 10 Mbps as that required by the new application D, that is, the required communication rate for the new application D.

The base station 20b subtracts the assigned radio resources (thirty-two slots) from the total radio resources (forty slots), and the obtained result (eight slots) is the maximum assignable radio resources for the new application D.

Further, the base station 20b calculates the admissible communication rate for the application D when the propagation quality is the lowest between the mobile station 10 and the base station 20. Specifically, the transmission rate for one slot is 550 kbps when the propagation quality is the lowest between the mobile station 10 and the base station 20b, the admissible communication rate for eight slots is eight multiplied by 550 kbps, and the product 4.4 Mbps is the admissible communication rate with the lowest propagation quality.

This admissible communication rate of 4.4 Mbps is less than the required communication rate of 10 Mbps. Therefore, the base station 20b does not admit the request for the service by the new application b, and notifies the mobile station 10 of the admissible communication rate of 4.4 Mbps. The mobile station 10 notifies the base station 20b of a new required communication rate not higher than the admissible communication rate of 4.4 Mbps, for example, 4 Mbps. This required communication rate of 4 Mbps is less than the admissible communication rate of 4.4 Mbps. Therefore, the base station 20*b* admits the request for the service by the new application D, and assigns an amount of radio resources (here, eight slots) to the new application D to enable communications at the required communication rate of 4 Mbps in the mobile station 10 even at places where the propagation quality is the lowest between the mobile station 10 and the base station 20. Then the base station 20*b* sends an admission permission message to the mobile station 10.

Subsequently, the radio resources assigned to the applications A, B, C, and D correspond to forty slots. Under this condition, the mobile station 10 calls a new application E, and notifies the base station 20*b* of a communication rate of 20 Mbps as that required by the new application E, that is, the required communication rate for the new application E.

The base station 20*b* subtracts the assigned radio resources (forty slots) from the total radio resources (forty slots), and the result is zero. Therefore, the base station 20*b* does not admit the request for the service by the new application E.

Figure 18:
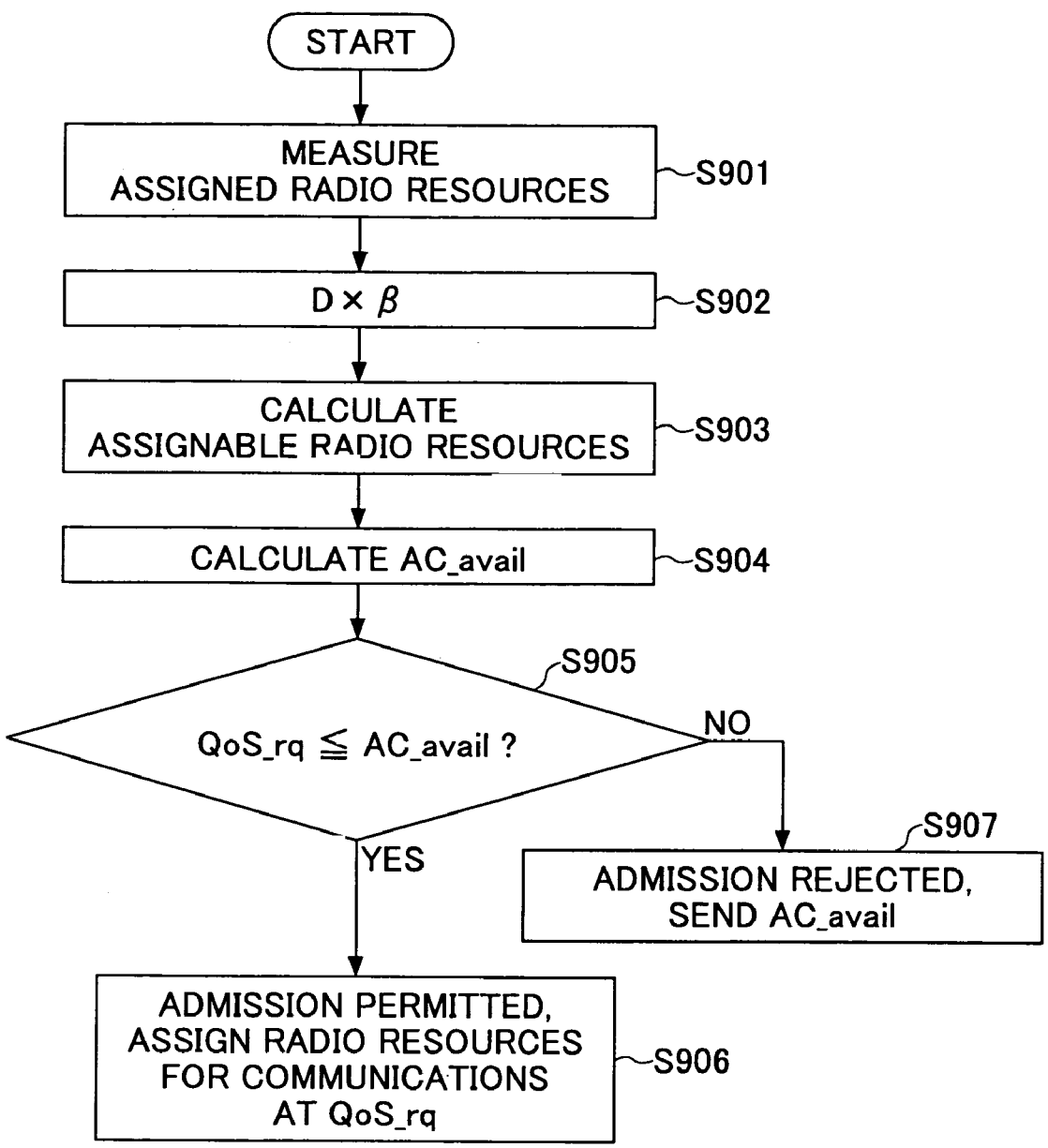
FIG. 18 is a flowchart showing the operation of the base station 20b according to the third embodiment.

FIG. 18 is a flowchart showing the operation of the base station 20*b* according to the third embodiment. As shown below, the step S904 through S907 are the same as the step S504 through S507 shown in FIG. 11 in the first embodiment.

In step S901, after the mobile station 10 calls a new application and sends the required communication rate, the base station 20*b* identifies the assigned radio resources.

In step S902, the base station 20*b* multiplies the assigned radio resources by a factor $\beta$.

In step S903, the base station 20*b* subtracts the assigned radio resources multiplied by the factor $\beta$ from the total radio resources and obtains the maximum assignable radio resources for the new application.

In step S904, the base station 20*b* calculates the admissible communication rate for the application E when the propagation quality is the lowest between the mobile station 10 and the base station 20*b* based on the maximum assignable radio resources for the new application.

In step S905, the base station 20*b* determines whether the required communication rate for the new application is less than the admissible communication rate.

In step S906, if the required communication rate for the new application is less than the admissible communication rate, the base station 20*b* admits the request for the service by the new application, and assigns an amount of radio resources to the new application to enable communications at the required communication rate even at places where the propagation quality is the lowest between the mobile station 10 and the base station 20*b*. Then the base station 20*b* sends an admission permission message to the mobile station 10.

In step S907, if the required communication rate for the new application is higher than the admissible communication rate, the base station 20*b* does not admit the request for the service by the new application, and sends a request rejection message and the admissible communication rate to the mobile station 10.

Fourth Embodiment

The configurations of the mobile station and the base station of the fourth embodiment are the same as those of the mobile station 10 and the base station 20*b* of the third embodiment as shown in FIG. 15, except for the following differences. In the following, the same numeral references are used as in the third embodiment.

The required communication rate setting unit 13 sets an upper limit and a lower limit of the required communication rate when requesting a quantitatively-guaranteed service.

Further, the admission determining unit 27 in the base station 20*b* compares the admissible communication rate with the upper limit and the lower limit of the required communication rate. If the upper limit of the required communication rate is not higher than the admissible communication rate, the admission determining unit 27 admits the request for the service by the new application, and assigns an amount of radio resources that enables communications at the required communication rate even when the propagation quality is the lowest between the mobile station 10 and the base station 20.

If the admissible communication rate is between the lower limit and the upper limit of the required communication rate, the admission determining unit 27 admits the request for the service by the new application, and assigns an amount of radio resources that enables communications at the required communication rate even when the propagation quality is the lowest between the mobile station 10 and the base station 20. The admission determining unit 27 further sends an admission permission message to the mobile station 10 via the transmitter 21.

If the admissible communication rate is lower than the lower limit of the required communication rate, the admission determining unit 27 does not admit the request for the service by the new application; the admission determining unit 27 sends a request rejection message together with the admissible communication rate to the mobile station 10 via the transmitter 21.

Figure 19:
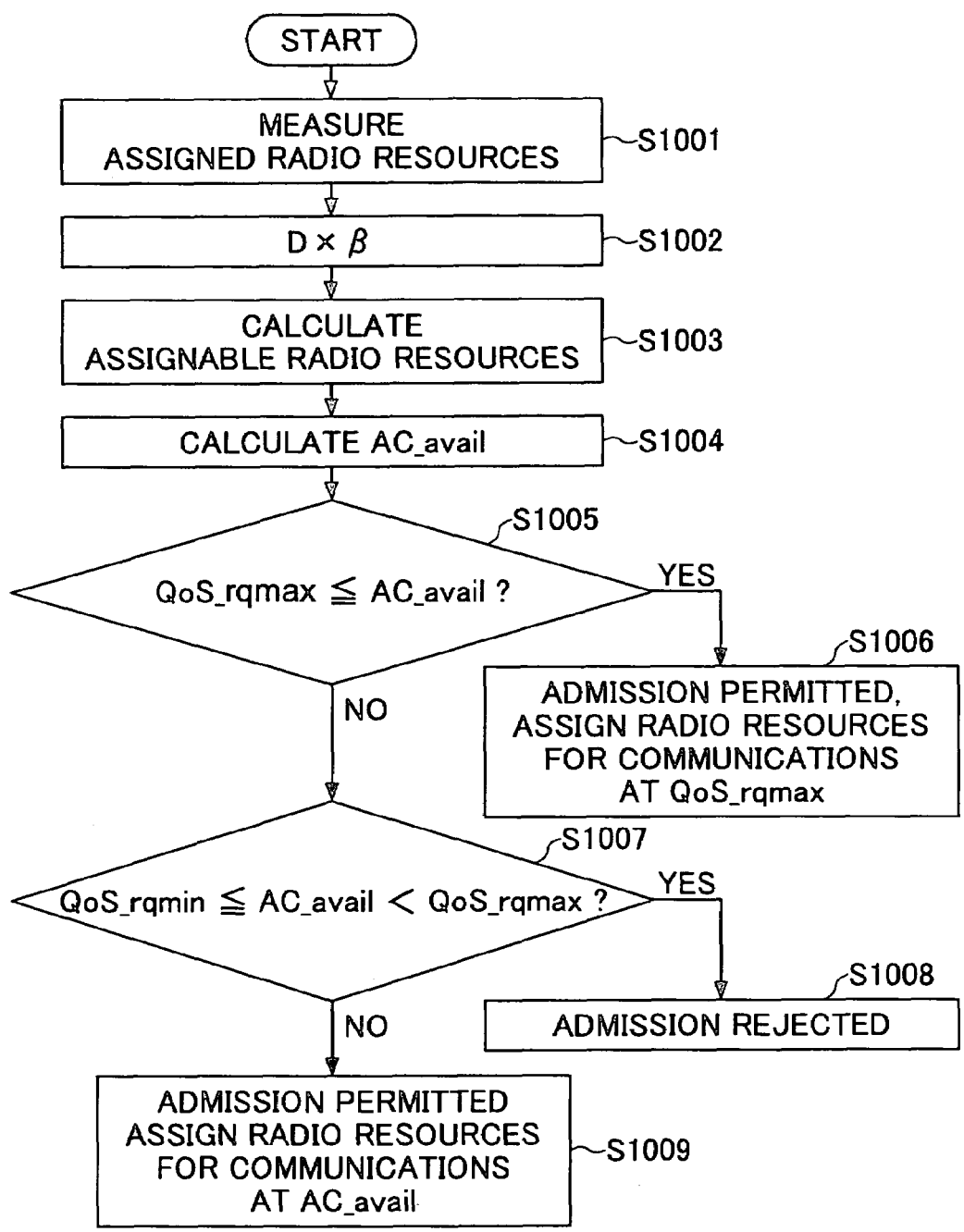
FIG. 19 is a flowchart showing the operation of the base station 20b according to the fourth embodiment.

FIG. 19 is a flowchart showing the operation of the base station 20*b* according to the fourth embodiment. As shown below, the step S1004 through step S1009 are the same as the step S704 through step S709 shown in FIG. 13 in the second embodiment.

In step S1001, after the mobile station 10 calls a new application and sends the required communication rate, the base station 20*b* identifies the assigned radio resources.

In step S1002, the base station 20*b* multiplies the assigned radio resources by a factor $\beta$.

In step S1003, the base station 20*b* subtracts the assigned radio resources multiplied by the factor $\beta$ from the total radio resources and obtains the maximum assignable radio resources for the new application.

In step S1004, the base station 20*b* calculates the admissible communication rate for the application E when the propagation quality is the lowest between the mobile station 10 and the base station 20*b* based on the maximum assignable radio resources for the new application.

In step S1005, the base station 20*b* determines whether the highest required communication rate (that is, the upper limit) for the new application is less than the admissible communication rate.

In step S1006, if the highest required communication rate for the new application is less than the admissible communication rate, the base station 20*b* admits the request for the service by the new application, and assigns an amount of radio resources to the new application to enable communications at the highest required communication rate even at places where the propagation quality is the lowest between the mobile station 10 and the base station 20*b*. Then the base station 20*b* sends an admission permission message to the mobile station 10.

In step S1007, if the highest required communication rate for the new application is higher than the admissible communication rate, the base station 20b determines whether the admissible communication rate is between the lower limit and the upper limit of the required communication rate.

In step S1008, if the admissible communication rate is out of the range between the lower limit and the upper limit of the required communication rate, the base station 20b does not admit the request for the service by the new application, and sends a request rejection message and the admissible communication rate to the mobile station 10.

In step S1009, if the admissible communication rate is between the lower limit and the upper limit of the required communication rate, the base station 20b admits the request for the service by the new application, and assigns an amount of radio resources to the new application to enable communications at the admissible communication rate even at places where the propagation quality is the lowest between the mobile station 10 and the base station 20b. Then the base station 20b sends an admission permission message to the mobile station 10.

In the previous embodiments, it is assumed that the radio resources are managed in terms of frames, but the present invention is not limited to this configuration. The present invention is applicable even in the case of the radio resources not managed in terms of frames. In this case, for example, the constituent element of the radio resources is the communication rate. Below, embodiments involving such radio resources are described.

Fifth Embodiment

In the fifth embodiment, the configurations of the mobile station and the base station are the same as those shown in FIG. 8 in the first embodiment. Below, the same numeral references are used as in the first embodiment.

In the fifth embodiment, the mobile station 10 transmits only one required communication rate to the base station 20, and the base station 20 calculates the admissible communication rate by using the radio resources utilization by the other applications corresponding to the quantitatively-guaranteed service.

The used resources measurement unit 24 measures the radio resources utilization (slot, code) relative to the total communication rates able to be provided by the base station 20.

The admissible communication rate calculating unit 26 subtracts the measured radio resources utilization from unity (full utilization), and multiplies the result by the total available communication rate, thus obtains the admissible communication rate. Other operations are the same as those in the first embodiment.

Figure 20:
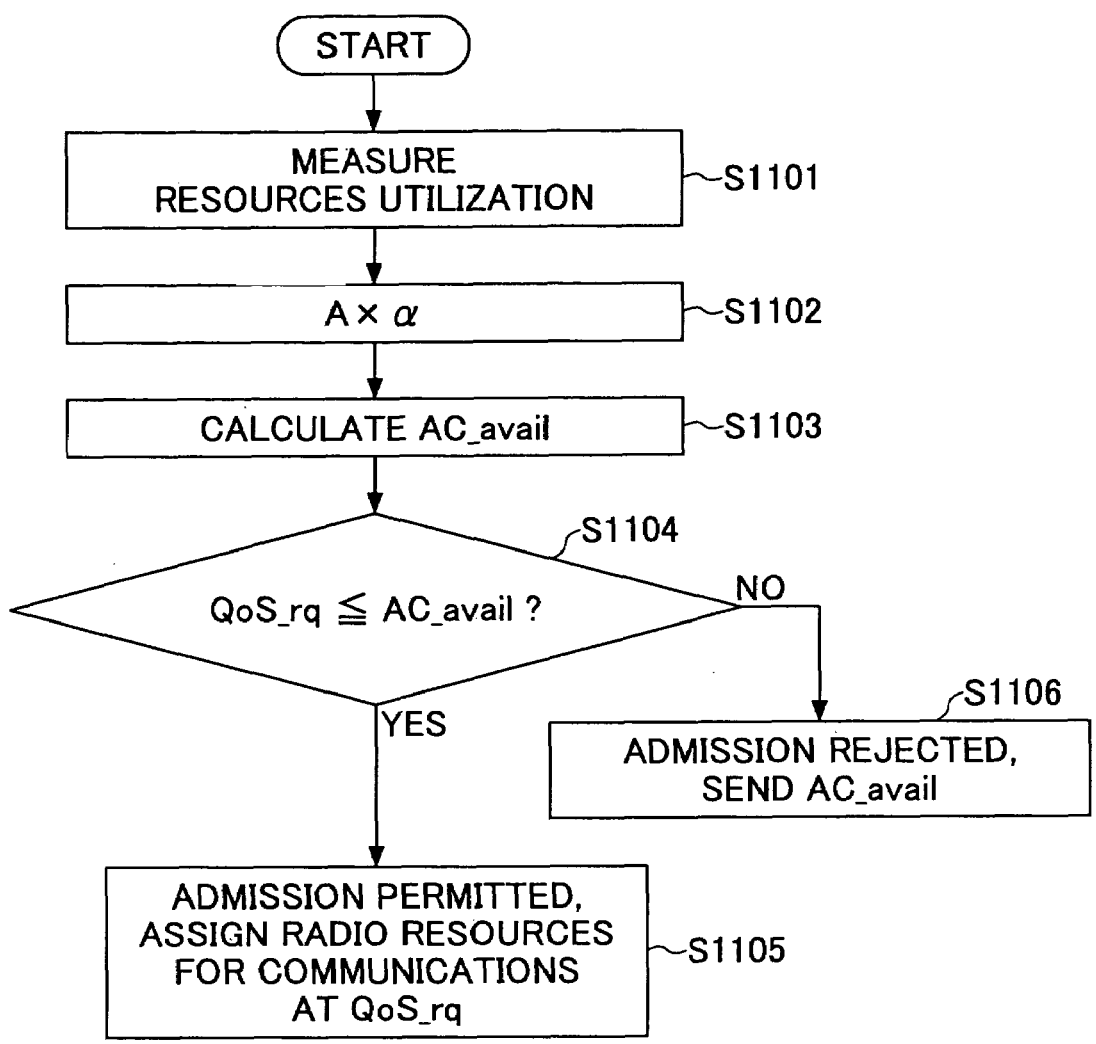
FIG. 20 is a flowchart showing the operation of the base station 20 according to the fifth embodiment.

FIG. 20 is a flowchart showing the operation of the base station 20 according to the fifth embodiment. As shown below, the step S1104 through step S1106 are the same as the step S505 through step S507 shown in FIG. 11 in the first embodiment.

In step S1101, after the mobile station 10 calls a new application and sends the required communication rate, the base station 20 measures the radio resources utilization.

In step S1102, the base station 20 multiplies a factor α and the total available communication rate by the radio resources utilization.

In step S1103, the base station 20 subtracts the resultant product obtained in step S1102 from the total available communication rate, thus obtains the admissible communication rate.

In step S1104, the base station 20 determines whether the required communication rate for the new application is less than the admissible communication rate.

In step S1105, if the required communication rate for the new application is less than the admissible communication rate, the base station 20 admits the request for the service by the new application, and assigns an amount of radio resources to the new application to enable communications at the required communication rate even at places where the propagation quality is the lowest between the mobile station 10 and the base station 20. Then the base station 20 sends an admission permission message to the mobile station 10.

In step S1106, if the required communication rate for the new application is greater than the admissible communication rate, the base station 20 does not admit the request for the service by the new application, and sends a request rejection message and the admissible communication rate to the mobile station 10.

The operation of the mobile station 10 is the same as that described in FIG. 12 in the first embodiment.

Sixth Embodiment

The configurations of the mobile station and the base station of the sixth embodiment are the same as those of the mobile station 10 and the base station 20 in the fifth embodiment except for the following differences. Below, the same numeral references are used as in the first embodiment.

In the sixth embodiment, the mobile station 10 transmits an upper limit and a lower limit of the required communication rate to the base station 20, and the base station 20 calculates the admissible communication rate by using the radio resources utilization of the other applications. corresponding to the quantitatively-guaranteed service.

The required communication rate setting unit 13 in the mobile station 10 sets the upper limit and the lower limit of the required communication rate when requesting a quantitatively-guaranteed service.

Further, the admission determining unit 27 in the base station 20 compares the admissible communication rate with the upper limit and the lower limit of the required communication rate. If the upper limit of the required communication rate is not higher than the admissible communication rate, the admission determining unit 27 admits the request for the service by the new application, and assigns an amount of radio resources that enables communications at the required communication rate even when the propagation quality is the lowest between the mobile station 10 and the base station 20.

If the admissible communication rate is between the lower limit and the upper limit of the required communication rate; the admission determining unit 27 admits the request for the service by the new application, and assigns an amount of radio resources that enables communications at the required communication rate even when the propagation quality is the lowest between the mobile station 10 and the base station 20.

If the admissible communication rate is lower than the lower limit of the required communication rate, the admission determining unit 27 does not admit the request for the service by the new application; the admission determining unit 27 sends a request rejection message together with the admissible communication rate to the mobile station 10 via the transmitter 21.

Figure 21:
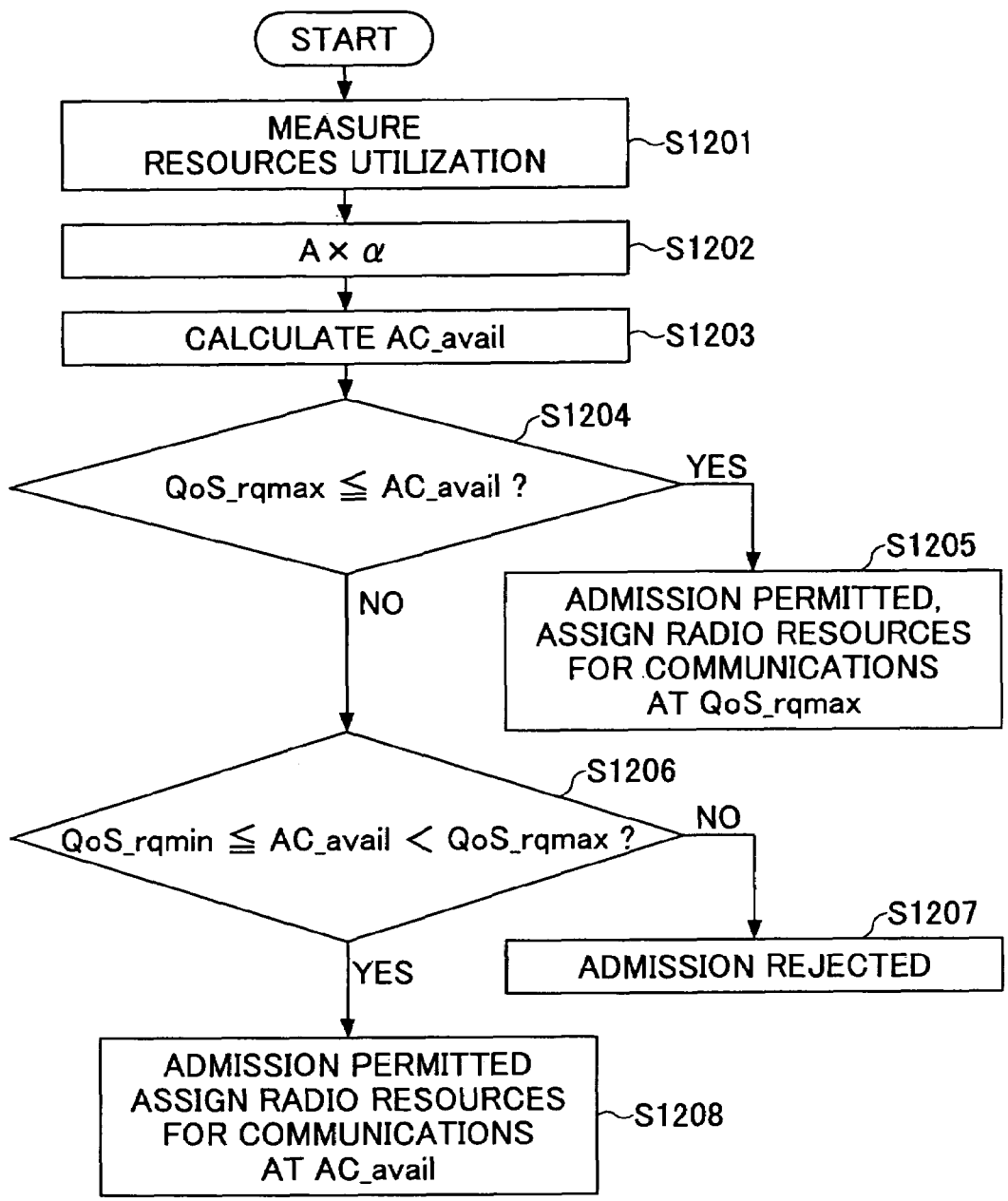
FIG. 21 is a flowchart showing the operation of the base station 20 according to the sixth embodiment.

FIG. 21 is a flowchart showing the operation of the base station 20 according to the sixth embodiment. As shown below, the step S1201 through step S1203 are the same as the step S1101 through step S1103 shown in FIG. 20 in the fifth embodiment, and the step S1204 through step S1208 are the same as the step S705 through step S709 shown in FIG. 13 in the second embodiment.

In step S1201, after the mobile station 10 calls a new application and sends the required communication rate, the base station 20 measures the radio resources occupation.

In step S1202, the base station 20 multiplies a factor $\alpha$ and the total available communication rate by the radio resources utilization.

In step S1203, the base station 20 subtracts the resultant product obtained in step S1102 from the total available communication rate, thus obtains the admissible communication rate.

In step S1204, the base station 20 determines whether the highest required communication rate (that is, the upper limit) for the new application is less than the admissible communication rate.

In step S1205, if the highest required communication rate for the new application is less than the admissible communication rate, the base station 20 admits the request for the service by the new application, and assigns an amount of radio resources to the new application to enable communications at the highest required communication rate even at places where the propagation quality is the lowest between the mobile station 10 and the base station 20. Then the base station 20 sends an admission permission message to the mobile station 10.

In step S1206, if the highest required communication rate for the new application is higher than the admissible communication rate, the base station 20 determines whether the admissible communication rate is between the lower limit and the upper limit of the required communication rate.

In step S1207, if the admissible communication rate is out of the range between the lower limit and the upper limit of the required communication rate, the base station 20 does not admit the request for the service by the new application, and sends a request rejection message and the admissible communication rate to the mobile station 10.

In step S1208, if the admissible communication rate is between the lower limit and the upper limit of the required communication rate, the base station 20 admits the request for the service by the new application, and assigns an amount of radio resources to the new application to enable communications at the admissible communication rate even at places where the propagation quality is the lowest between the mobile station 10 and the base station 20. Then the base station 20 sends an admission permission message to the mobile station 10.

The operation of the mobile station 10 is the same as that described in FIG. 14 in the second embodiment.

Seventh Embodiment

In the seventh embodiment, the configurations of the mobile station and the base station are the same as those shown in FIG. 15 in the third embodiment. Below, the same numeral references are used as in the third embodiment.

In the seventh embodiment, the mobile station 10 transmits only one required communication rate to the base station 20b, and the base station 20b calculates the admissible communication rate by using the communication rate assigned to the other applications corresponding to the quantitatively-guaranteed service.

When the propagation quality is the lowest between the base station 20b and the mobile station 10, where the other applications for the quantitatively-guaranteed service are called for other mobile stations, the storage unit 28 stores the summation of the communication rates assigned to the other applications (referred to as "assigned communication rate" below).

The assigned resources storage unit 28 sends the assigned communication rates to the admissible communication rate calculating unit 26, when the assigned resources storage unit 28 is notified by the required communication rate identifying unit 23 that the required communication rate identifying unit 23 has received an admission request message.

The admissible communication rate calculating unit 26 subtracts the assigned communication rate from the total available communication rate. As in the fifth embodiment, the total available communication rate is defined to be the summation of the communication rates that can be provided by the base station 20b when the modulation coding scheme resulting in the lowest communication rate is used under the condition of the lowest propagation quality. From this, the admissible communication rate calculating unit 26 calculates the admissible communication rate when the propagation quality is the lowest between the base station 20b and the mobile station 10.

The admissible communication rate calculating unit 26 may subtract the assigned communication rate multiplied by the factor $\beta$ from the total available communication rate.

The used resources measurement unit 24 may calculate communication utilization relative to the total communication rates able to be provided by the base station 20. The admissible communication rate calculating unit 26 subtracts the communication utilization from unity (full utilization), and multiplies the result by the total available communication rate, and thus obtains the admissible communication rate. Other operations are the same as those in the third embodiment.

Figure 22:
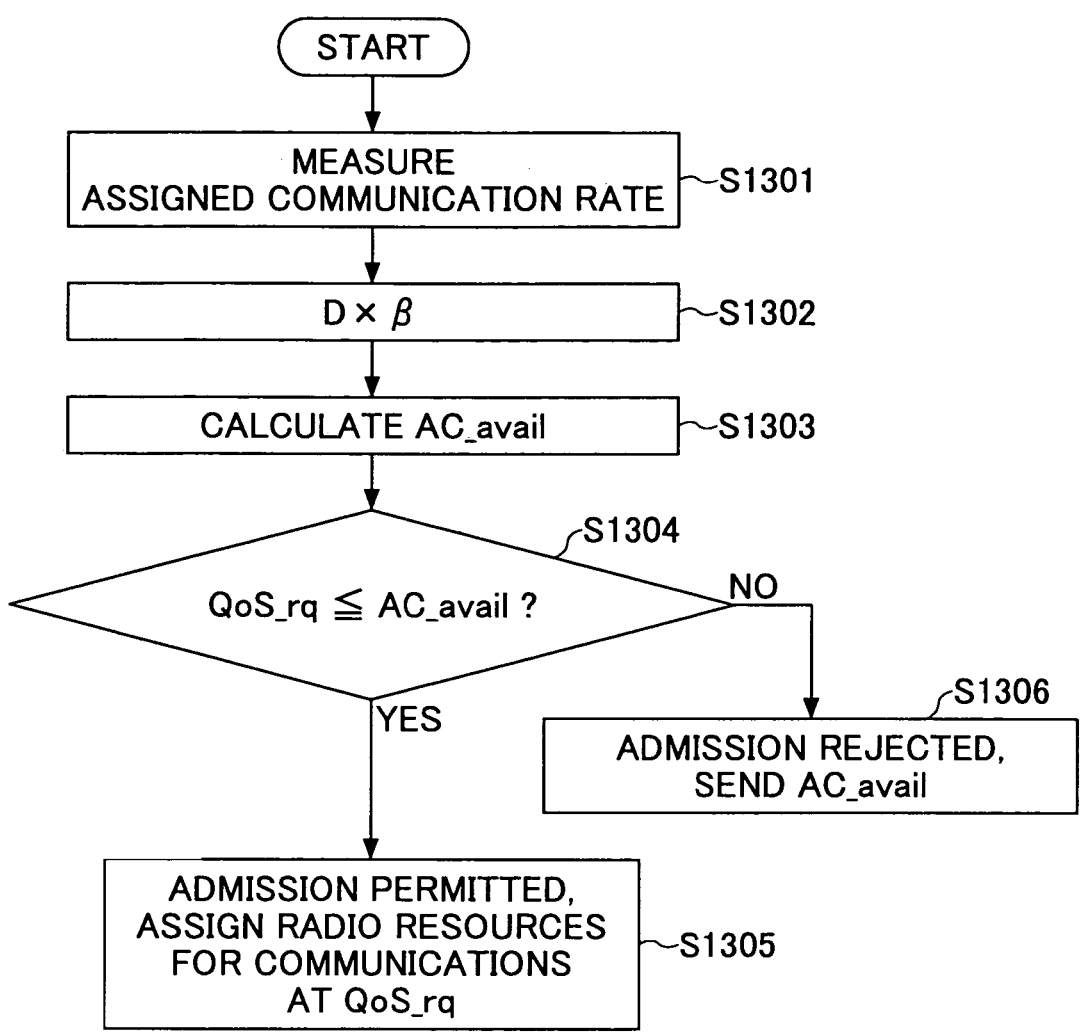
FIG. 22 is a flowchart showing the operation of the base station 20 according to the seventh embodiment.

FIG. 22 is a flowchart showing the operation of the base station 20b according to the seventh embodiment. As shown below, the step S1304 through step S1306 are the same as the step S1104 through step S1106 shown in FIG. 20 in the fifth embodiment.

In step S1301, after the mobile station 10 calls a new application and sends the required communication rate, the base station 20b measures the assigned communication rate.

In step S1302, the base station 20b multiplies the assigned communication rate by a factor $\beta$.

In step S1303, the base station 20b subtracts the result obtained in step S1302 from the total available communication rate, thus obtains the admissible communication rate.

In step S1304, the base station 20b determines whether the required communication rate for the new application is less than the admissible communication rate.

In step S1305, if the required communication rate for the new application is less than the admissible communication rate, the base station 20b admits the request for the service by the new application, and assigns an amount of radio resources to the new application to enable communications at the required communication rate even at places where the propagation quality is the lowest between the mobile station 10 and the base station 20. Then the base station 20b sends an admission permission message to the mobile station 10.

In step S1306, if the required communication rate for the new application is higher than the admissible communication rate, the base station 20b does not admit the request for the service by the new application, and sends a request rejection message and the admissible communication rate to the mobile station 10.

The operation of the mobile station 10 is the same as that described in FIG. 12 in the first embodiment.

Eighth Embodiment

The configurations of the mobile station and the base station of the eighth embodiment are the same as those of the mobile station 10 and the base station 20b in the seventh embodiment except for the following differences. Below, the same numeral references are used as in the seventh embodiment.

In the eighth embodiment, the mobile station 10 transmits an upper limit and a lower limit of the required communication rate to the base station 20, and the base station 20b calculates the admissible communication rate by using communication rates assigned to the other applications corresponding to the quantitatively-guaranteed service.

The required communication rate setting unit 13 in the mobile station 10 sets the upper limit and the lower limit of the required communication rate when requesting a quantitatively-guaranteed service.

Further, the admission determining unit 27 in the base station 20b compares the admissible communication rate with the upper limit and the lower limit of the required communication rate. If the upper limit of the required communication rate is not higher than the admissible communication rate, the admission determining unit 27 admits the request for the service by the new application, and assigns an amount of radio resources that enables communications at the required communication rate even when the propagation quality is the lowest between the mobile station 10 and the base station 20.

If the admissible communication rate is between the lower limit and the upper limit of the required communication rate, the admission determining unit 27 admits the request for the service by the new application, and assigns an amount of radio resources that enables communications at the required communication rate even when the propagation quality is the lowest between the mobile station 10 and the base station 20.

If the admissible communication rate is lower than the lower limit of the required communication rate, the admission determining unit 27 does not admit the request for the service by the new application; the admission determining unit 27 sends a request rejection message together with the admissible communication rate to the mobile station 10 via the transmitter 21.

Figure 23:
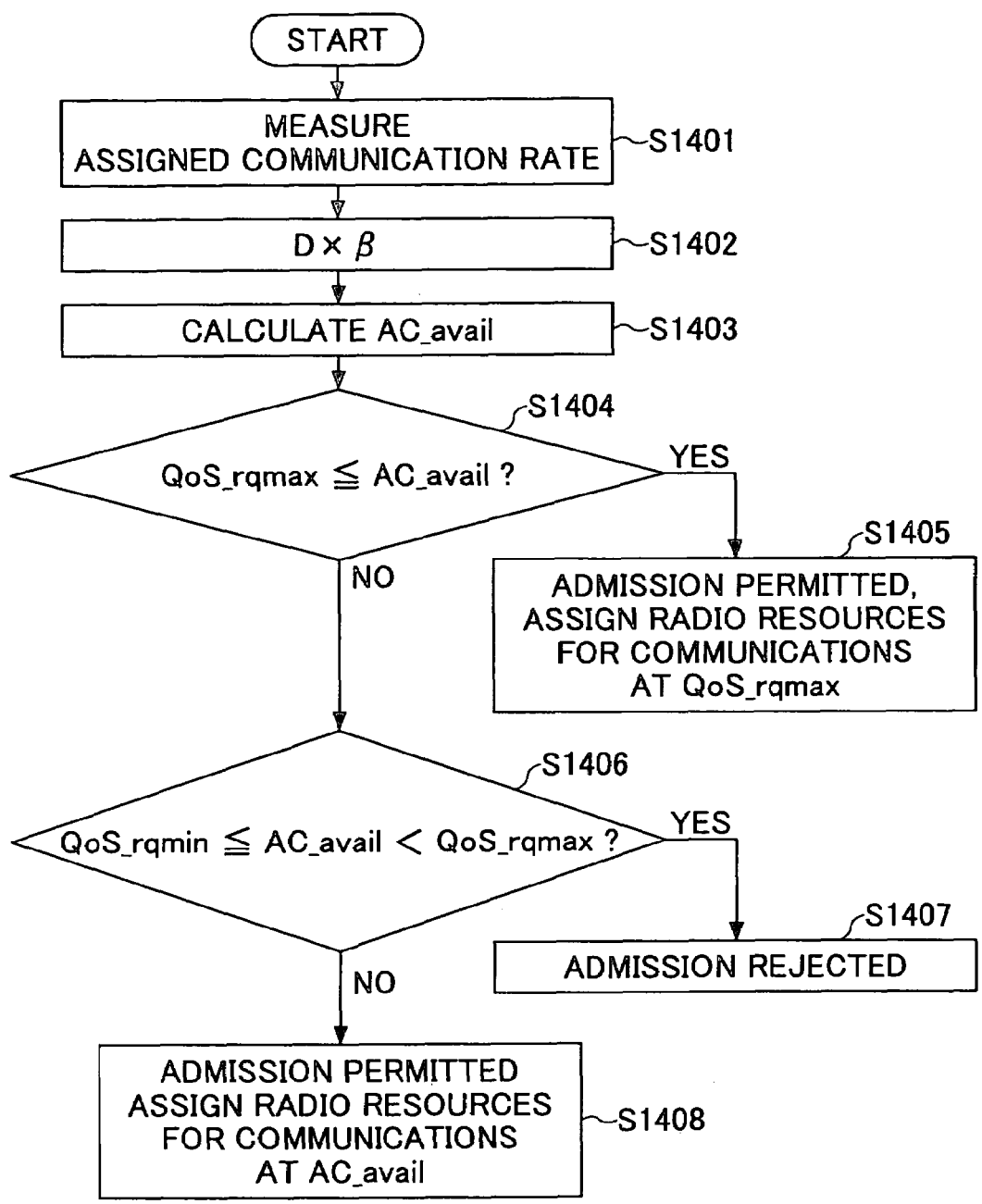
FIG. 23 is a flowchart showing the operation of the base station 20 according to the eighth embodiment.

FIG. 23 is a flowchart showing the operation of the base station 20b according to the eighth embodiment. As shown below, the step S1401 through step S1403 are the same as the step S1301 through step S1303 shown in FIG. 22 in the seventh embodiment, and the step S1404 through step S1208 are the same as the step S705 through step S709 shown in FIG. 13 in the second embodiment.

In step S1401, after the mobile station 10 calls a new application and sends the required communication rate, the base station 20b measures the assigned communication rate.

In step S1402, the base station 20b multiplies the radio resources utilization by a factor β.

In step S1403, the base station 20b subtracts the result obtained in step S1402 from the total available communication rate, and thus obtains the admissible communication rate.

In step S1404, the base station 20b determines whether the highest required communication rate (that is, the upper limit) for the new application is less than the admissible communication rate.

In step S1405, if the highest required communication rate for the new application is less than the admissible communication rate, the base station 20b admits the request for the service by the new application, and assigns an amount of radio resources to the new application to enable communications at the highest required communication rate even at places where the propagation quality is the lowest between the mobile station 10 and the base station 20. Then the base station 20b sends an admission permission message to the mobile station 10.

In step S1406, if the highest required communication rate for the new application is higher than the admissible communication rate, the base station 20b determines whether the admissible communication rate is between the lower limit and the upper limit of the required communication rate.

In step S1407, if the admissible communication rate is out of the range between the lower limit and the upper limit of the required communication rate, the base station 20b does not admit the request for the service by the new application, and sends a request rejection message and the admissible communication rate to the mobile station 10.

In step S1408, if the admissible communication rate is between the lower limit and the upper limit of the required communication rate, the base station 20b admits the request for the service by the new application, and assigns an amount of radio resources to the new application to enable communications at the admissible communication rate even at places where the propagation quality is the lowest between the mobile station 10 and the base station 20. Then the base station 20b sends an admission permission message to the mobile station 10.

The operation of the mobile station 10 is the same as that described in FIG. 14 in the second embodiment.

According to the embodiments described above, the admissible communication rate, as an example of the reference quality of the invention, is calculated by assuming a situation in which the communication rate at the mobile station corresponds to the lowest communication rate obtainable at the mobile station, for example, the mobile station is at the edge of a cell formed by the base station, acting as an admission control device. In addition, the base station compares the required communication rate and the admissible communication rate to determine whether the request from the mobile station can be admitted. For example, the base station may admit the request if the required communication rate is less than or equal to the admissible communication rate. Due to this, even at places where the propagation quality is low, the mobile station is able to maintain communications. In other words, regardless of changes of the propagation quality, radio resources can be appropriately assigned.

In addition, when a part of the assigned radio resource to other applications is not used, for example, if the amount of transmission data is smaller than expected, the base station 20 may calculate the assignable radio resource by subtracting the radio resource actually used by the other applications from the total available radio resource, and this assignable radio resource is the maximum radio resource assignable to the requested service. Due to this, it is possible to use the radio resources effectively. At least, the difference between the total radio resource and the radio resource assigned to the other applications at the lowest communication rate may be used as the assignable radio resource. Since the assignable radio resource obtained in this way does not include the radio resources used by the other applications, it can be surely assigned to the requested service.

Further, if the required communication rate is greater than the admissible communication rate and the base station rejects the request, the mobile station is notified of this decision and the admissible communication rate as well.

Upon that, the mobile station may take necessary steps in response, for example, the mobile station may change the value of the required communication rate, or change the service.

Further, the base station preferentially assigns the radio resource to the quantitatively-guaranteed service rather than to the relatively-guaranteed service. Due to this, a larger number of the quantitatively-guaranteed services may be provided.

While the present invention is described above with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, the communication rate is used as an example of the quality of service (QoS). But the present invention is not limited to this. Other quantities, such as the delay time, and the data error rate may also be used.

In addition, in the above embodiments, the mobile station is described as a data transmission source or a data reception source. The present invention is also applicable to the cases in which the mobile station functions as a relay station. Further, in addition to the base station, other devices such as a radio network control device may also be used as the admission control device.

It is certain that the mobile station of the present invention is also applicable to a mobile host in the next generation mobile communications, and the base station is applicable to an access point.

Summarizing the effect of the invention, it is possible to appropriately assign radio resources even when a propagation quality changes.

This patent application is based on Japanese Priority Patent Application No. 2002-335719 filed on Nov. 19, 2002, the entire contents of which are hereby incorporated by reference.

What is claimed is:

1. A method of operating an admission control device in a mobile communication system capable of providing a first communication that guarantees a service quality and a second communication that does not guarantee the service quality at a mobile station, comprising:
sending a required service quality required by an application from the mobile station to the admission control device when the mobile station sends a service request, the mobile station configured to request one of the first communication which is a quantitatively guaranteed service and the second communication which is a relatively guaranteed service, according to a type of the application;
calculating, by the admission control device upon receiving a request for the first communication, a reference service quality as an admissible service quality, said reference service quality being a service quality when a propagation quality is lowest at the mobile station; and
admitting, by the admission control device, the service request from the mobile station if the required service quality is less than or equal to the reference service quality.

2. The method as claimed in claim 1, wherein in the step of calculating, the admission control device calculates an assignable radio resource and calculates the reference service quality based on the assignable radio resource.

3. The method as claimed in claim 2, wherein the assignable radio resource is calculated by subtracting a radio resource being used by communications different from the first communication from a total available radio resource.

4. The method as claimed in claim 2, wherein the assignable radio resource is calculated by subtracting a radio resource assigned to communications different from the first communication from a total available radio resource, said radio resource assigned to the communications allowing the communications to have the lowest propagation quality.

5. The method as claimed in claim 1, wherein
the required service quality is in a range from a lower limit to an upper limit; and
the admission control device admits the service request of the mobile station if the reference service quality is in the range of the required service quality.

6. The method as claimed in claim 1, further comprising:
sending the reference service quality to the mobile station by the admission control device if the required service quality is greater than the reference service quality.

7. The method as claimed in claim 6, wherein the required service quality is in a range from a lower limit to an upper limit; and the mobile station changes the required service quality to the reference service quality if the lower limit is less than or equal to the reference service quality, and changes the first communication to the second communication if the lower limit is higher than the reference service quality.

8. The method as claimed in claim 1, wherein the admission control device preferentially assigns a radio resource to the first communication rather than to the second communication.

9. A mobile communication system comprising:
a mobile station; and
an admission control device for controlling admission of a service request from the mobile station and providing a first communication that guarantees a service quality and a second communication that does not guarantee the service quality, wherein
the mobile station includes a transmission unit configured to send a notification of a service quality required by an application to the admission control device when the mobile station sends a service request, the mobile station configured to request one of the first communication which is a relatively guaranteed service and the second communication which is a quantitatively guaranteed service, according to a type of the application; and
the admission control device includes:
a calculation unit configured to calculate, upon receiving a request for the first communication a reference service quality as an admissible service quality, said reference service quality being a service quality when a propagation quality is lowest at the mobile station; and
an admission unit configured to admit the service request from the mobile station if the required service quality is less than or equal to the reference service quality.

10. A mobile station for requesting a first communication that guarantees a service quality and a second communication that does not guarantee the service quality at the mobile station, the mobile station configured to request one of the first communication and the second communication, according to a type of an application that makes a service request from the mobile station, said mobile station comprising:
a transmission unit configured to send a required service quality required by the application to an admission control device when requesting the first communication which is a quantitatively guaranteed service, the admission control device controlling admission of a service request from the mobile station; and a modification unit configured to change the required service quality to a reference service quality if the required service quality is less than or equal to the reference service quality, and to change the first communication to the second communication which is a relatively guaranteed service if the required service quality is higher than the reference service quality, said reference service quality being an admissible service quality when a propagation quality is lowest at the mobile station, which is calculated by an admission control device.

11. An admission control device for controlling admission of a service request, including a required service quality, from a mobile station, including one of a first communication that guarantees a service quality and a second communication that does not guarantee the service quality, comprising:

a calculation unit configured to calculate a reference service quality as an admissible service quality when receiving a request for the first communication which is quantitatively guaranteed service, said reference service quality being a service quality when a propagation quality is lowest at the mobile station; and an admission unit configured to admit the service request from the mobile station if the required service quality is less than or equal to the reference service quality.

12. The admission control device as claimed in claim 11, wherein the calculation unit calculates an assignable radio resource and calculates the reference service quality based on the assignable radio resource.

13. The admission control device as claimed in claim 12, further comprising a measurement unit configured to measure a radio resource being used by communications different from the first communication;

wherein the calculation unit calculates the assignable radio resource by subtracting the used radio resource from a total available radio resource.

14. The admission control device as claimed in claim 12, wherein the calculation unit calculates the assignable radio resource by subtracting a radio resource assigned to communications different from the first communication from a total available radio resource, said radio resource assigned to the communications allowing the communications to have the lowest propagation quality.

15. The admission control device as claimed in claim 11, wherein the required service quality is in a range from a lower limit to an upper limit; and the admission unit admits the service request of the mobile station if the reference service quality is in the range of the required service quality.

16. The admission control device as claimed in claim 11, further comprising:

a transmission unit configured to send the reference service quality to the mobile station if the required service quality is greater than the reference service quality.

17. The admission control device as claimed in claim 11, wherein the determination unit preferentially assigns a radio resource to the first communication rather than to the second communication.

18. A computer readable storage medium encoded with computer program instructions that when executed by a processor perform steps for operating an admission control device that controls admission of a service request from a mobile station including one of a first communication guaranteeing a service quality and a second communication not guaranteeing the service quality, comprising the steps of:

calculating a reference service quality, as an admissible service quality when receiving a request for the first communication which is a quantitatively guaranteed service, said reference service quality being a service quality when a propagation quality is lowest at the mobile station; and determining whether to admit the service request of the mobile station based on the reference service quality.

* * * * *